United States Patent [19]
Lee et al.

[11] Patent Number: 5,361,211
[45] Date of Patent: Nov. 1, 1994

[54] CONTROL SYSTEM FOR AUTOMATICALLY CONTROLLING ACTUATORS OF AN EXCAVATOR

[75] Inventors: Jin H. Lee, Yeongi; Sang C. Heo, Suseong; Jang U. Jo, Chungmu; Jin T. Kim; Keun T. Lee, both of Changweon; Ju K. Kim, Buk; Sang T. Jeong, Seoul; Bong D. Hoang, Chanweon; Chan H. Lee, Hoaseong, all of Rep. of Korea

[73] Assignee: Samsung Heavy Industries Co., Ltd., Changwon, Rep. of Korea

[21] Appl. No.: 783,559

[22] Filed: Oct. 28, 1991

[30] Foreign Application Priority Data

Oct. 31, 1990 [KR] Rep. of Korea .................. 90-17524
Nov. 27, 1990 [KR] Rep. of Korea .................. 90-19240
Dec. 29, 1990 [KR] Rep. of Korea .................. 90-22379
Dec. 29, 1990 [KR] Rep. of Korea .................. 90-22380
Dec. 29, 1990 [KR] Rep. of Korea .................. 90-22381
Dec. 29, 1990 [KR] Rep. of Korea .................. 90-22384

[51] Int. Cl.⁵ ............................................. G06F 15/20
[52] U.S. Cl. ............................. 364/424.07; 340/686; 414/699; 364/167.01
[58] Field of Search .......... 364/167.01, 424.07; 340/684, 685, 686; 172/2, 4, 4.5, 12, 450; 37/413, 902, 904, 907; 414/694, 698, 699, 700

[56] References Cited

U.S. PATENT DOCUMENTS

| | | | |
|---|---|---|---|
| 3,638,211 | 1/1972 | Sanchez | 340/685 |
| 3,740,534 | 6/1973 | Kezer et al. | 364/424.07 |
| 3,934,126 | 1/1976 | Zalesov et al. | 364/424.07 |
| 4,511,974 | 4/1985 | Nakane et al. | 340/685 |
| 4,552,503 | 11/1985 | Mouri et al. | 172/2 |
| 4,833,615 | 5/1989 | Bitner et al. | 364/424.07 |
| 4,866,641 | 8/1989 | Nielsen et al. | 364/424.07 |
| 5,065,326 | 11/1991 | Sahm | 414/699 |
| 5,088,020 | 2/1992 | Nishida et al. | 364/424.07 |
| 5,160,239 | 11/1992 | Allen et al. | 414/699 |
| 5,178,510 | 1/1993 | Hanamoto et al. | 414/699 |

Primary Examiner—Gary Chin
Attorney, Agent, or Firm—Price, Heneveld, Cooper, DeWitt & Litton

[57] ABSTRACT

A control system for automatically controlling the operation of actuators of an excavator. The control system of the invention provides several advantages in that the travelling mode of the travelling motors is automatically changed between the first and second step travelling modes in order to efficiently correspond to the load imposed on the travelling motors depending on the ground surface condition, the brake mechanism for the swing motor section is controlled with an adjustable timing control, the synchronous operation of the swing motor and the boom cylinder is controlled by simply setting a relative actuating velocity therebetween, flow rate of hydraulic fluid from the main hydraulic pumps to each actuator is automatically controlled in case of handling the control levers/pedals for initiating the actuators or stopping the actuating of the actuators, flow rate of the hydraulic fluid for the cylinder actuators in order to drive the cylinder actuators without occurrence of shock at an end of cylinder of each cylinder actuator, a lifting operation of an excavator is adjustably controlled so as to prevent a tipping accident of the excavator.

16 Claims, 13 Drawing Sheets

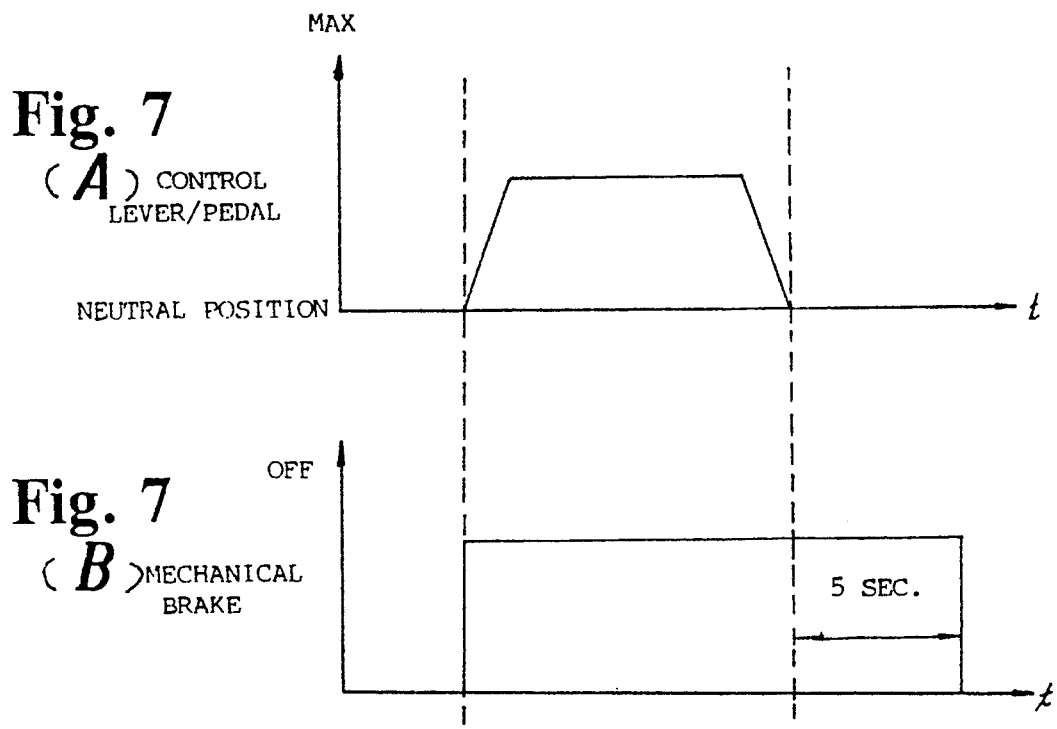
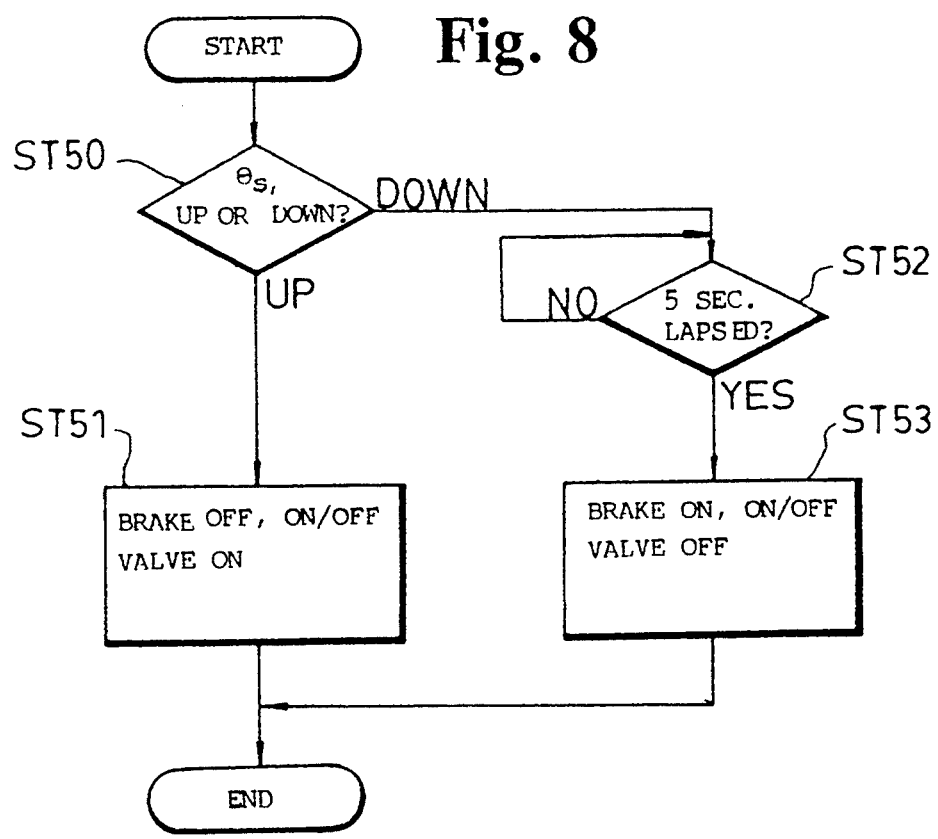

CONTROL SYSTEM FOR AUTOMATICALLY CONTROLLING ACTUATORS OF AN EXCAVATOR

BACKGROUND OF THE INVENTION

1. Field of the Invention

The present invention relates to a control system for automatically controlling operations of an excavator, a kind of construction machinery, and more particularly to an automatic control system for automatically controlling actuators, such as a boom cylinder, a dipper cylinder, a bucket cylinder, a swing motor and a pair of travelling motors of the excavator. The system automatically controls the actuators to be optimally operated, thereby improving the operational effect and control of the actuators, and help prevent a sudden safety accident during operation of the excavator.

2. Description of The Prior Art

Conventionally, known excavators include a plurality of actuators actuated by hydraulic power. These excavators comprise a driving motor section including the swing motor for swinging an upper frame including a control cab with respect to a lower frame provided with travelling members, such as crawlers. The travelling motors effect travelling of the excavators. An actuating cylinder section comprising the dipper cylinder drives a dipper stick. The boom cylinder drives a boom. A bucket cylinder drives a bucket. The actuators are controlled by control levers/pedals provided in the cab and handled by the operator in order to efficiently carry out several operations of the excavator, such as excavating operations, surface finishing operations, loading operations, and the like.

However, known excavators have disadvantages which cause fatigue of the operator, deteriorate the operational effect of the excavator, causing the actuators to be broken, and possibly causing a safety accident to occur during operations carried out thereby.

First, the known excavator is provided with a pair of travelling motors actuated by hydraulic fluid distributed from the main hydraulic pumps. Control levers/pedals are used by the operator to control the quantity of the hydraulic fluid flow to the respective travelling motors via directional control valves for each of the travelling motors, in accordance with the handling values of the levers/pedals. Also, the excavator includes a solenoid valve, disposed between the inclination angle control members of the travelling motors and sub-hydraulic pump, and adapted for opening and shutting the hydraulic passage from the sub-hydraulic pump to the inclination angle control members. A select switch selectively applies an electric current to the solenoid valve in order to turn the solenoid valve on. Thus, the operator handles the travelling motor control lever/pedal so that a respective quantity of the hydraulic fluid flow, from the main pumps to the travelling motors, is automatically controlled in accordance with the position of the control lever/pedal. The travelling velocity of the travelling motors is changed in a non-step manner. Also, upon turning on the select switch, the solenoid valve is turned on so as to make a fluid passage between the sub-hydraulic pump and the inclination angle control members of the travelling motors, thereby causing the pilot hydraulic fluid to be supplied from the sub-hydraulic pump to the inclination angle control members by way of the fluid passage. As a result, the inclination angle of the travelling motors is controlled so that the velocity of the travelling motors can be controlled.

In other words, if the select switch is turned off, hereinafter referred to "the first step travelling mode," the solenoid valve is applied with no electric current. As a consequence, the fluid passage between the sub-hydraulic pump and the inclination angle control members is shut, and the inclination angles of the travelling motors are maintained at previously set initial angles. In this case, upon handling the control levers/pedals, the travelling velocity $V_T$ in the first step travelling mode is changed in a non-step manner, in accordance with the handling values of the control levers/pedals, from the lowest value $V=0$ to the highest value $V_1$ max as represented in FIG. 3.

On the other hand, if the select switch is turned on, hereinafter referred to "the second step travelling mode," the solenoid valve is applied with an electric current so that the fluid passage between the sub-hydraulic pump and the inclination angle control members is opened, and the inclination angles of the travelling motors are changed by specified angles by the pilot hydraulic fluid of the sub-hydraulic pump. In this case, upon handling the control levers/pedals, the travelling velocity $V_T$ in the second step travelling mode is changed in a non-step manner in accordance with the handling values of the control levers/pedals from the lowest value $V=0$ to the highest value $V_2$max, which is relatively greater than $V_1$max, as represented in FIG. 3.

However, upon occurrence of an overload on the travelling motors during travelling of the excavator in the second step travelling mode by turning on the select switch, the travelling velocity is suddenly lost. Such an overload occurs when the load is larger than a maximum allowable load $P_2$max, which occurs, for example, when the excavator grade is over 40°. Furthermore, the engine and the main hydraulic pumps may suddenly stop, thereby causing occurrence of a safety accident. Also, the operator has to manually select the travelling mode, e.g., the first travelling mode or the second travelling mode, by handling the control levers/pedals in accordance with a grade of the ground surface. However, the travelling motors of the known excavator in an overload condition cannot be efficiently operated, such that a load occurring on the travelling motors which varies according to the grade of the ground surface may exceed the capacity of the excavator motors. Thus, the known excavator has a disadvantage in that it cannot efficiently travel on a relatively high grade of ground surface.

Second, in case of the known excavator having a conventional brake mechanism for applying the brake to the swinging motor adapted for swinging the upper frame with respect to the lower frame, the operator selectively applies or releases the mechanical braking power for the reduction gears of the swing motor by means of a mechanical brake as needed. However, the known excavator has a disadvantage in that the braking operation for the swing motor cannot be efficiently performed, and the swing motor may be driven in order to forcibly swing the upper frame with respect to the lower frame even the braking power of the brake mechanism is applied to the reduction gears. This may cause the reduction gears of the swing motor to be seriously broken. The known excavator has another disadvantage in that the braking power for the brake mechanism may not endure the torque of the swing section of the excavator, such as in the case of operation thereof on a relatively higher grade of ground surface, so that the swing motor section may swing in spite of appliance of the braking power of the brake mechanism to the reduction gears of the swing motor section, thereby causing a serious safety accident.

Third, the hydraulic circuit of the known excavator is provided with a pair of main hydraulic pumps which are connected in parallel to each half of the actuators. Also, a cross hydraulic passage is cross-connected between two actuators selected from each half of the actuators connected to each main pump and is treated as if it is often overloaded so that the fluid flow output from both main hydraulic pumps can be supplied to an overloaded actuator, which is one of the actuators cross connected by the cross hydraulic passage, at the same time. Hence, the actuator can endure a relatively higher load simultaneously with preventing the main pumps from being overloaded. Especially, a directional control valve for the swing motor is cross-connected to a directional control valve for the boom cylinder by means of a cross hydraulic passage which is provided with check valve and a two port directional control valve and a control lever for selectively controlling the pressure of the pilot hydraulic fluid for the two port directional control valve. The fluid is output from the sub-hydraulic pump. Thus, in case of a synchronous operation of actuators in which the swing motor and the boom cylinder are driven at the same time, the boom cylinder conventionally having a relatively higher load than that of the swing motor in this case, a part of the hydraulic fluid from the first main pump for the swing motor can be supplied to directional control valve of the boom cylinder by way of the two port directional control valve of the cross hydraulic passage. This additional fluid is joined with the fluid flow from the second main pump for the boom cylinder.

In the case of an operation for loading excavated objects to transporting equipment, such as a truck, by simultaneous actuation of the control levers for each of the swing motor and the boom cylinder after accomplishing the excavating operation, the control levers for both actuators may be set to their maximum position at the same time, in order to lift up the boom simultaneously with driving the swing motor at the same velocity. In this case, if the transporting equipment, e.g., the truck, is positioned at about a 90° angle with respect to the plane position of the boom, the boom may strike the body of the truck because it cannot ascend to a position above the truck before the swing motor accomplishes its 90° swinging action. Thus, the control levers for each of the swing motor and the boom cylinder are conventionally handled in several stages in order to prevent such an accident, resulting from striking the truck body with the boom. For example, the lever for the boom cylinder is first handled to raise the boom to a safe height, taking into account of the height of the truck, and the lever for the swing motor is then handled in order to swing the upper frame of the excavator with respect to the lower frame. According to another technique, the control lever for the swing motor is first handled in order to swing the upper frame moving the boom close to the truck, and the lever for the boom cylinder is handled in order to perform the desired loading operation of the truck. Thus, the known excavator has a disadvantage in that the loading operation cannot be smoothly and continuously performed, thereby deteriorating the loading operation and burdening an unskilled operator with a relatively difficult loading operation.

Fourth, as described above the quantity of the hydraulic fluid flow which is to be outputted from the main hydraulic pumps to the directional control valves for the actuators is controlled by the control levers/pedals for respective actuators in order to control the actuating value of each actuator. The control levers/pedals are frequently handled in order to start actuation of the subject actuators or to change the actuating direction. At this time, the flow rate of the hydraulic fluid from the main pumps to the directional control valves for the subject actuators is suddenly changed, thereby generating a mechanical shock between the actuators and the hydraulic fluid supplied thereto.

In other words, the actuators temporarily continue the previous state thereof by virtue of mechanical performance. This continuance may result from static friction in the case of starting the actuation, or inertia force acting on the previous actuating direction in case of changing the actuating direction of the actuator, while the hydraulic fluid for the subject actuators is suddenly supplied from the main pump to the actuators in the case of starting the actuation, or suddenly changes the flow direction thereof in the case of changing the actuating direction of the actuators. Thus, a serious mechanical shock occurs between the actuators and the hydraulic fluid, resulting from a striking of the hydraulic fluid and the actuators.

In an effort to solve the above problem, a skilled operator slowly and minutely handles the control levers/pedals so as to make the initial flow rate of the hydraulic fluid be as low as possible. The skilled operator thus makes an effort to reduce the mechanical shock between the actuators and the hydraulic fluid. However, for the unskilled operator, such a minute handling of the control levers/pedals is regarded as a relatively difficult operation, such that the operational effect of the excavator is considerably deteriorated. Even in the case of a skilled operator, such a minute handling is considered to be a burden, and furthermore the mechanical shock cannot be completely removed.

Therefore, the known excavator has the disadvantage that the useful life of the actuators is shortened, because of the mechanical shock generated on the actuators. Also, the operational effect of the excavator is considerably deteriorated because of the minute handling of the control levers/pedals required to reduce the mechanical shock, as described above.

Fifth, as described above, the quantity of the hydraulic fluid flow supplied from the main hydraulic pumps to each of the cylinder actuators, such as the dipper cylinder, the bucket cylinder and the boom cylinder, is controlled by handling the control levers for each cylinder actuator. However, if the control lever for each cylinder is not positioned at the neutral position, but at an actuating position during such handling of the control lever, a mechanical shock will occur, at an end of the cylinder actuator, between the piston rod of the cylinder actuator and the hydraulic fluid due to the quantity of the hydraulic fluid flow. In an effort to remove such a mechanical shock between the piston rod and the hydraulic fluid, a known excavator is provided with a mechanical shock absorber inside each cylinder actuator. However, such an absorber cannot completely remove the mechanical shock. As a result, the known excavator has a disadvantage in that the operational effect and the durability of the cylinder actuators are considerably deteriorated because of the mechanical shock occurring on the cylinder actuators.

Sixth, the excavator is conventionally used for lifting a heavy load, such as a heavy rock, a heavy container, or the like, by means of the operation members comprising the boom, the dipper stick and a lifting hook instead of a bucket. However, in case of a heavy load having a weight over a predetermined allowable maximum lifting capacity of the excavator, the excavator is occasionally tipped, resulting in a serious safety accident. In an effort to prevent such an accident, a specification of the maximum allowable lifting capacity is provided inside a control cab of known excavators in order to allow the operator to determine whether the excavator is capable of lifting the item to be lifted. However, such a determination of the lifting weight at every lifting operation is considered as a burden, resulting in the operator's unconscious omission of the determination in spite of the possibility of an accident if the excavator tips. Also, the maximum lifting capability of the excavator varies in accordance with the operational conditions, and an adjustable extent of the allowable maximum lifting capability of the excavator cannot be easily determined. Thus, the known excavator has a disadvantage in that the operational effect in the case of the lifting operation is considerably deteriorated due to the burdensome determination of the lifting weight at every lifting operation, and furthermore, a serious accident of tipping thereof occasionally occurs due to an erroneous determination of the maximum lifting capability of the excavator.

SUMMARY OF THE INVENTION

Therefore, an operational control system for actuators of an excavator according to the present invention is accomplished in an effort to overcome the above-mentioned disadvantages.

It is an object of the present invention to provide an operational control system for actuators of an excavator in which during travelling of the excavator by handling of the control levers/pedals for the travelling motors, the travelling mode of travelling motors is automatically changed between a first step travelling mode and a second step travelling mode in accordance with variations of the ground surface condition, thereby making it possible for the excavator to travel efficiently while protecting the travelling motors. Thus, the optimal travelling operation of the excavator is accomplished irrespective of the ground surface conditions.

It is another object of the present invention to provide an operational control system for actuators of an excavator in which, in the case of handling a control lever for the swing motor of the excavator to initiate a swinging state of the swing motor, the upper frame of the excavator is swung to a desired angle with respect to the lower frame. To stop the swinging state of the swing motor, the mechanical brake disposed at the reduction gears of the swing motor section is automatically controlled to apply or remove the braking power for the swing motor section. An on/off valve for the swing motor is also automatically turned on or turned off so that a desired braking operation for the swing motor is automatically controlled.

It is still another object of the present invention to provide an operational control system for actuators of an excavator in which, in the case of handling the control levers/pedals for the swing motor and the boom cylinder at the same time in order to lift the boom simultaneously with swinging the upper frame of the excavator with respect to the lower frame, a swinging velocity of the swing motor with respect to a lifting velocity of the boom is selectively controlled by the operator taking account of the operational conditions so that a relative velocity between the swing motor and the boom cylinder can be automatically controlled. This causes the swinging of the swing motor and the lifting of the boom to be smoothly and continuously performed.

It is still another object of the present invention to provide an operational control system for actuators of an excavator in which, in the case of handling the control levers/pedals for initiating the actuators or stopping the actuating of the actuators, the flow rate of the hydraulic fluid from the main hydraulic pumps to each actuator is automatically controlled. This efficiently prevents a mechanical shock occurring between the actuator and the hydraulic fluid.

It is still another object of the present invention to provide an operational control system for actuators of an excavator in which the cylinder actuators, such as the dipper cylinder, the bucket cylinder and the boom cylinder, are automatically driven without occurrence of shock at an end of cylinder of each cylinder actuator. This efficiently controls the cushioning of the cylinder actuators.

It is still another object of the present invention to provide an operational control system for actuators of an excavator in which, upon sensing an occurrence of tipping of the car frame of the excavator due to a load which is over a predetermined level on the basis of an allowable maximum lifting capability of the excavator during a lifting operation, an alarm representing such an overweight load is generated in order to alarm the operator to danger of tipping. The actuator is also automatically controlled to be stopped irrespective of the handling by the operator in case a weight is over a predetermined weight such that it is capable of causing the excavator to tip.

In one aspect of the present invention, an excavator comprises actuators including a boom cylinder for actuating a boom, a dipper cylinder for actuating a dipper stick, a bucket cylinder for actuating a bucket, a swing motor for swinging an upper frame of the excavator with respect to a lower frame thereof and travelling motors for affecting travelling the excavator. A control process for automatically controlling a control apparatus controls the operation of actuators includes: an electronic controller for controlling the operation of the actuators; main hydraulic pumps for supplying hydraulic fluid for the actuators; a sub-hydraulic pump for supplying pilot hydraulic fluid; a plurality of directional control valves each connected to the main hydraulic pumps and the electronic controller for controlling operational direction of said actuators and also the quantity of said hydraulic fluid flow; pilot valve blocks adapted to controllably move spools of the directional control valves in accordance with electric control signals outputted from the electronic controller; inclination angle control valves disposed between the controller and the main pumps for controlling inclination angles of the main hydraulic pumps in order to control the quantity of hydraulic fluid flow outputted therefrom; positional sensors provided at respective actuators in order to sense positional displacement values of the actuators; control levers/pedals for outputting respective electric signals, corresponding to actuator values, to the controller; and a plurality of amplifiers disposed among the controller and the pilot valve blocks and the inclination angle control valves, respectively, for amplifying electric signals outputted from the controller to the pilot valve blocks and the inclination angle control valves. The control process further comprises the steps of: determining whether handling values for the travelling motors received from the control levers/pedals are zero in order to operate control current signals, each for controlling the pilot valve blocks and the inclination angle control valves of the main hydraulic pumps, from the handling values in case the handling values are not zero, and then output said control current signals, but turn off a solenoid valve of the travelling motors, the solenoid valve disposed between the travelling motors and the sub-hydraulic pumps in order to control an inclination angle of each travelling motor, in case that the handling values are zero; upon receiving electric signals each representing the actuating velocity of each travelling motor from the positional sensors of the travelling motors in case of maximum handling values, determining whether the solenoid valve of the travelling motors is applied with a current; depending on a result of the determination of whether the current is applied to the solenoid valve of the travelling motors, comparing the actuating velocity of the travelling motors with a control velocity in the case of a first step travelling mode and an allowable minimum velocity in the case of a second step travelling mode, in order to turn on and turn off the solenoid valve of the travelling motors, thereby controlling inclination angles of the main hydraulic pumps.

According to another aspect of the invention, an excavator comprises actuators including a boom cylinder for actuating a boom, a dipper cylinder for actuating a dipper stick, a bucket cylinder for actuating a bucket, a swing motor for swinging an upper frame of the excavator with respect to a lower frame thereof, and travelling motors for running the excavator. An apparatus for automatically controlling the operation of actuators comprises an electronic controller for controlling the operation of the actuators; main hydraulic pumps for supplying hydraulic fluid for the actuators; a sub-hydraulic pump for supplying pilot hydraulic fluid; a plurality of directional control valves each connected to the main hydraulic pumps and the electronic controller for controlling operational direction of the actuators and also the quantity of hydraulic fluid flow; pilot valve blocks adapted to controllably move spools of the directional control valves in accordance with electric control signals outputted from the electronic controller; inclination angle control valves disposed between the controller and the main pumps for controlling inclination angles of the main hydraulic pumps in order to control the quantity of hydraulic fluid flow outputted therefrom; positional sensors provided at respective actuators in order to sense positional displacement values of the actuators; control levers/pedals for outputting respective electric signals corresponding to handling values for actuators to the controller; and a plurality of amplifiers disposed among the controller and the pilot valve blocks and the inclination angle control valves, respectively, for amplifying electric signals outputted from the controller to the pilot valve blocks and inclination angle control valves. The apparatus includes: a relay electrically connected to the controller in order to turn on or turn off the control circuit of the control apparatus in accordance with an electrical signal of the controller corresponding to a handling value of the swing motor; a solenoid valve electrically connected to the relay in order to be turned on or turned off by the relay; a mechanical brake disposed at reduction gears of the swing motor and connected to the solenoid valve in order to be selectively driven by the solenoid valve so as to apply or release a braking power for the reduction gears; an on/off valve for initiating and stopping a swinging operation of the swing motor depending upon an on/off state of the solenoid valve, such that the mechanical brake is controlled to immediately remove the braking power from the reduction gears in the case of initiating the swinging operation of the swing motor, but to apply the braking power for the reduction gears upon lapsing of 5 seconds after changing the driving state of the swing motor into stop state.

According to still another aspect of the invention, a control process comprises the steps of: upon receiving a handling value for the swing motor from the control levers/pedals, determining whether the handling value for the swing motor is an increasing value, indicating that the control levers/pedals for the swing motor were shifted from a neutral position to a swing position, or a decreasing value, indicating a contrary shift of the control levers/pedals for the swing motor; controlling the mechanical value to remove the braking power thereof for the reduction gears within 0.1 second after the handling of the control levers/pedals and also turning on the on/off valve for driving the swing motor, in the case of an increasing value; determining whether 5 seconds have lapsed after the handling of the control levers/pedals in case of the decreasing value, and then upon determining that the 5 seconds have lapsed, driving the mechanical brake in order to apply the braking power for the reduction gears simultaneously with turning off the on/off valve in order to stop the swinging state of the swing motor.

In still another aspect of the present invention, a control process comprises the steps of: upon receiving electric signals corresponding to handling values for the swing motor and the boom cylinder from the control levers/pedals, determining whether the handling values are maximum values and then outputting electric signals to the pilot valve blocks and the inclination angle control valves in order to control the swing motor and the boom cylinder to be actuated at each actuating velocity in accordance with each handling value in case that even one of the handling values is not the maximum values; outputting electric signals to the pilot valve blocks in order to control the directional valves of the swing motor and the boom cylinder to be opened in maximum if the handling values are the maximum values; receiving a setting value for a relative velocity of the boom cylinder with respect to a velocity of the swing motor from a relative velocity control switch, said switch electrically connected to the controller and adapted to allow the operator to set the relative velocity; upon receiving the setting value, determining which actuator of the swing motor and the boom cylinder is to be actuated prior to the other and calculating each quantity of the hydraulic fluid flow which is outputted from each main hydraulic pump for driving the swing motor and the boom cylinder in order to correspond to the determined result; outputting electrical signals corresponding to the quantity of the hydraulic fluid flow of the main pump to the inclination angle control valves of the main hydraulic pumps in order to control inclination angles of the main hydraulic pumps, thereby controlling the quantity of the hydraulic fluid flow of the main hydraulic pumps for the swing motor and the boom cylinder corresponding to the setting value of the relative velocity control switch.

In still another aspect of the present invention, a control process comprises the steps of: receiving respective manipulation amounts from the control levers/pedals and respective values corresponding to positions of the actuators sensed by the positional sensors; operating respective predetermined velocities of actuators based on the manipulation mounts and respective operation velocities of actuators based on the operation position values and determining whether the operation state of the control levers/pedals is an acceleration state or a reduction state; if the operation state of control levers/pedals is the acceleration state, calculating respective optimum acceleration velocities on the basis of a standard acceleration curve and comparing the calculated optimum acceleration velocities with the corresponding predetermined velocities, respectively, so that when each acceleration velocity is lower than the corresponding predetermined velocity, an output velocity is set to the acceleration velocity, while when each acceleration velocity is equal to or higher than the corresponding predetermined velocity, the output velocity is set to the predetermined velocity; if the operation state of the control levers/pedals is the reduction state, determining whether each operation velocity is zero, and if the operation velocity is not zero, calculating each optimum reduction velocity on the basis of a reduction curve and comparing the calculated optimum reduction velocity with the corresponding predetermined velocity, so that when the reduction velocity is lower than or equal to the corresponding predetermined velocity, the output velocity is set to the predetermined velocity, while when the reduction velocity is higher than the corresponding predetermined velocity, the output velocity is set to the reduction velocity; and calculating respective output values corresponding to amounts of hydraulic fluid discharged from the main hydraulic pumps on the basis of the output velocities and sending the output values to the main hydraulic pumps, respectively.

In still another aspect of the present invention, a control apparatus comprises: a circuit for storing a specific reduction curve defining respective reduction velocities for actuators to stop without being subjected to impact and respective reduction ranges for actuators therein; an A/D signal converter adapted to convert analog signals from the control levers/pedals and positional sensors into digital signals, the analog signals being indicative of manipulation amounts of the control levers/pedals and current positions of the actuators; a D/A signal converter adapted to convert digital signals from the A/D signal converter; an amplifier adapted to amplify analog signals from the D/A signal converter and constituted by the amplifiers; and a controller receiving the output signals from the A/D signal converter, determining on the basis of received signals whether respective cylinder actuators are operated in the corresponding predetermined reduction ranges, and if the respective cylinder actuators are operated in their predetermined reduction ranges, sending control signals indicative of respective required discharge flow rates of hydraulic pumps and respective required stroke amounts of spools of directional control valves of cylinder actuators to said D/A signal converter so that operations of cylinder actuators are carried out along the reduction curve, thereby enabling them to stop without being subjected to impact.

In still another aspect of the present invention, a control process comprises the steps of: receiving respective manipulation amounts from the control levers/pedals and respective values corresponding to operation positions of the actuators sensed by the positional sensors; operating respective predetermined velocities of the actuators based on the manipulation amounts and respective operation velocities of the actuators based on the operation position values and determining whether respective piston rods of the actuators are positioned at respective ends of their corresponding cylinders; if each piston rod is not positioned at the end of the corresponding cylinder, determining whether the current position of each actuator is the reduction position, and if current position of each actuator is the reduction position, operating a reduction velocity and determining whether the reduction velocity is higher than the corresponding predetermined velocity; if the reduction velocity is higher than the predetermined velocity, an output velocity is set to the predetermined velocity, while if the reduction velocity is lower than or equal to the corresponding predetermined velocity, the output velocity is set to the reduction velocity; and calculating respective output values corresponding to amounts of hydraulic fluid discharged from the main hydraulic pumps on the basis of the output velocities and sending the output values to the main hydraulic pumps, respectively, thereby enabling the actuators to be controlled without being subject to impact.

In still another aspect of the present invention, a control apparatus comprises: a sensor sensing a weight of a material which is to be lifted by the excavator, said sensor electrically connected to an input port of the controller so as to output an electric signal corresponding to the sensed weight to the controller; a sensor sensing a tipping angle of the car frame of the excavator, the tipping sensor electrically connected to the input port of the controller so as to output an electric signal corresponding to the sensed tipping angle of the car frame to the controller; an alarm driving circuit electrically connected to an output port of the controller so as to drive a buzzer and an alarm lamp electrically connected thereto upon receiving an electric alarm signal from the controller, thereby alarming the operator of an overweight load to be lifted when the weight of the material to be lifted is over a predetermined level, and furthermore stopping a lifting operation of the excavator irrespective of the operator's control of the levers/pedals if the load exceeds another level capable of tipping the excavator.

In still another aspect of the present invention, a control process comprises the steps of: calculating an allowable maximum lifting capability of the excavator upon receiving electric signals each corresponding to the weight of the material to be lifted from the sensor sensing the lifting weight, respective operational positions of the actuators from the positional sensors, and a tipping angle of the car frame of the excavator from the sensor sensing the tipping angle; determining whether the lifting weight is over 80% of the calculated allowable maximum lifting capability, of the excavator in order to control the lifting operation of the excavator to be continued in accordance with the operator's handling of the control levers if the lifting weight is equal to or lower than 80% of the calculated allowable maximum lifting capability; determining whether the lifting weight is over 90% of the calculated allowable maximum lifting capability of the excavator, if the lifting weight is over 80% of the calculated allowable maximum lifting capability; driving the alarm driving circuit to allow the buzzer and the alarm lamp to be driven in order to alarm the operator to the overweight load and controlling the lifting operation of the excavator to be continued in accordance with the operator's handling of the control levers if the lifting weight is equal to or lower than 90% of the calculated allowable maximum lifting capability; and outputting electric signals to the pilot valve blocks in order to make the directional control valves of the actuators stop the lifting operation of the excavator irrespective of the handling of the operator if the lifting weight is over 90% of the allowable maximum lifting capability of the excavator.

BRIEF DESCRIPTION OF THE DRAWINGS

The above and other objects, features and advantages of the present invention will be more clearly understood from the following detailed description taken in conjunction with the accompanying drawings, in which:

FIGS. 7A and 7B are graphs showing a relation between the handling of the swing motor control lever and the mechanical brake during a swing operation;

FIG. 8 is a flow chart showing an automatic control process for braking operation of the swing motor section of FIG. 6;

FIGS. 10 and 11 are flow charts showing an automatic control process for controlling the relative velocity between the swing motor and the boom cylinder in accordance with the present invention, in which:

FIG. 10 is a flow chart of a hydraulic circuit without a cross hydraulic fluid line between the directional control valves for the swing motor and the boom cylinder;

FIG. 11 is a flow chart in case of a hydraulic circuit provided with a cross hydraulic fluid line between the directional control valves for the swing motor and the boom cylinder;

DETAILED DESCRIPTION OF THE PREFERRED EMBODIMENTS

Figure 1:
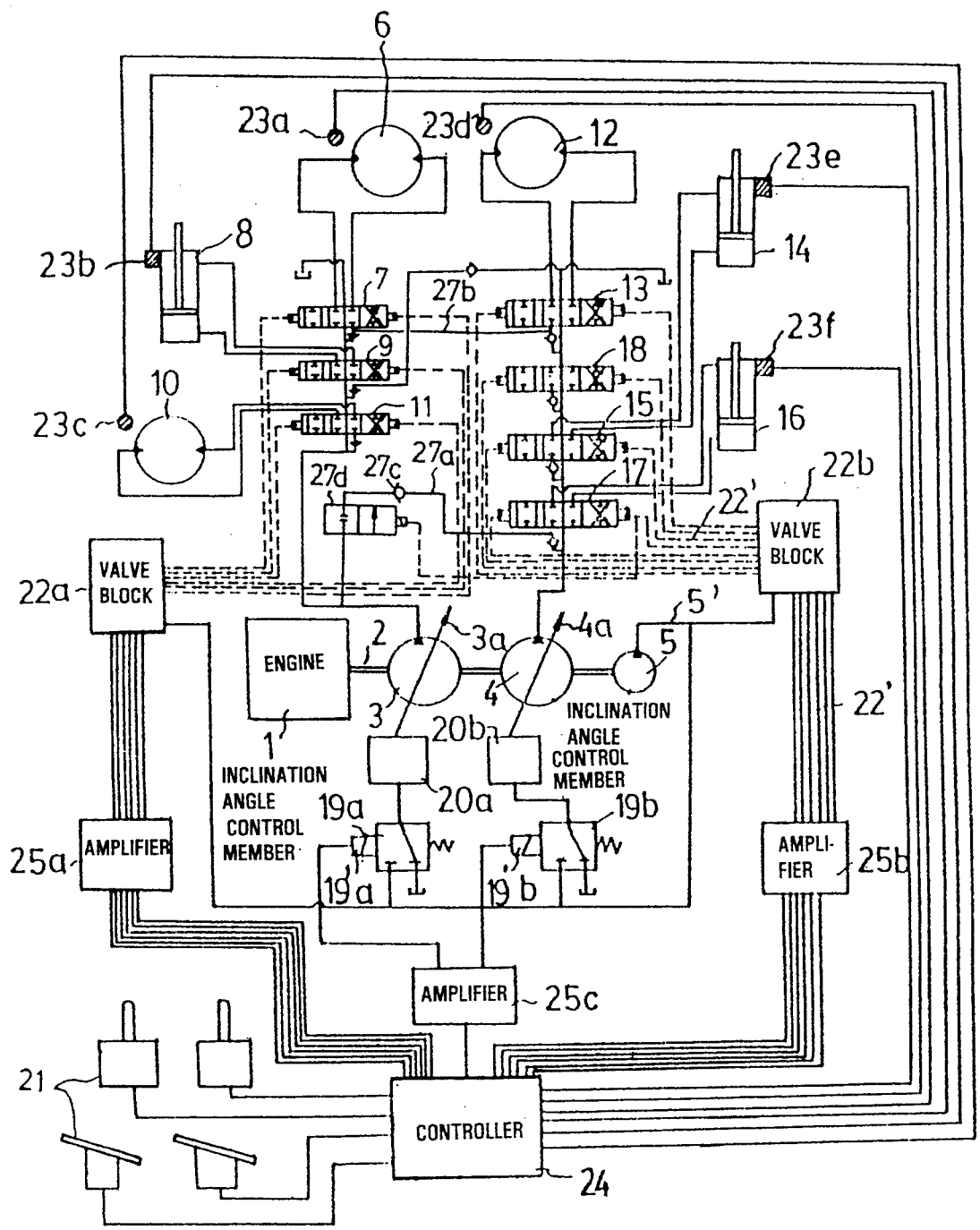
FIG. 1 is a schematic circuit diagram showing a basic hydraulic circuit of an operational control system for actuators of an excavator in accordance with the present invention.

Referring first to FIG. 1, a hydraulic circuit diagram of a basic circuit of an automatic actuating system for actuators of an excavator according to the present invention is shown. The basic hydraulic circuit includes a driving engine 1 for generating driving power for the driving elements of the excavator, a pair of main hydraulic pumps, first and second hydraulic pumps 3 and 4 sequentially and straightly connected to a driving shaft 2 of the engine 1, each comprising a swash plate pump. The second pump 4 is directly connected to a sub-hydraulic pump or a third pump 5 having a relatively smaller capacity than those of the first and second main pumps 3 and 4 and adapted for outputting a pilot hydraulic fluid.

The first main pump 3 is, as shown in the drawing, directly connected to a first group of directional control valves in order to be communicated therebetween. For example, a first directional control valve 7 controls the actuating direction of a left travelling motor 6 adapted for driving the left side crawler of the excavator. A second directional control valve 9 controls the actuating direction of a dipper cylinder 8 adapted for driving a dipper stick. A third directional valve 11 controls the actuating direction of a swing motor 10 adapted for swinging the upper frame provided with the control cab with respect to the lower frame provided with the crawlers.

In the same manner, the second main pump 4 is directly connected to a second group of directional control valves in order to provide fluid communication therebetween. For example, a fourth directional control valve 13 controls the actuating direction of a right travelling motor 12 adapted for driving the right side crawler of the excavator. A fifth directional control valve 15 controls the actuating direction of a bucket cylinder 14 adapted for driving a bucket. A sixth directional control valve 17 controlling the actuating direction of a boom cylinder 16 adapted for driving a boom. A preparatory directional control valve 18 for controlling the actuating direction of an auxiliary actuator (not shown) which may be equipped in the excavator as required by the consumer.

Additionally, the hydraulic fluid outputted from the third hydraulic pump 5 has a relatively smaller capacity than those of the first and second main pumps 3 and 4. This fluid is used as a pilot hydraulic fluid for actuating the swash plate 3a and 4a of the first and second main pumps 3 and 4 and the spool of each directional control valve 7, 9, 11, 13, 15, 17, 18. In other words, a part of the pilot hydraulic fluid from the third pump 5 is communicated through a fluid passage with a pair of inclination angle control members 20a and 20b, each adapted for controlling the inclination angle of the swash plate 3a, 4a of the main pump 3, 4, by way of a pair of inclination angle control valves 19a and 19b, each of which comprises a proportional valve provided with a solenoid 19'a, 19'b. The other part of the pilot hydraulic fluid from the third pump 5 is communicated through another fluid passage with each spool of the directional control valve 7, 9, 11, 13, 15, 17, 18 by way of a pair of electronic proportional valve blocks 22a and 22b, each connected to the directional control valve 7, 9, 11, 13, 15, 17, 18 and also to a controller 24 through a control line 22', and actuated under the control of the controller 24 in accordance with handling of the control levers/pedals 21 provided in the cab.

Also, control levers/pedals 21 comprise the same number of levers and pedals as the directional control valves 7, 9, 11, 13, 15, 17 and 18, that is the number of actuators 6, 8, 10, 12, 14 and 16. Also, the proportional pilot solenoid valve blocks 22a and 22b each includes therein the same number of proportional pilot valves (not shown) as those of a group of directional control valves 7, 9 and 11, or 13, 15, 17 and 18, connected to the corresponding valve block 22a, 22b. Therefore, a control lever/pedal 21 for an actuator which is to be actuated is handled in order to proportionally drive a proportional pilot solenoid valve provided in the valve block 22a, 22b for the handled control lever/pedal 21. Thus, the pilot hydraulic fluid outputted from the third pump 5 is supplied to a directional control valve 7, 9, 11, 13, 15, 17, 18 corresponding to the actuator which is to be actuated. Therefore, the spool of the directional control valve 7, 9, 11, 13, 15, 17, 18 supplied with the pilot hydraulic fluid from the third pump 5 moves right or left in order to last actuate the operating members, such as the bucket, the dipper stick or the like, in a desired direction.

As shown in FIG. 1, the hydraulic circuit is additionally provided with a plurality of sensors 23a to 23f for sensing positional displacement of the actuators 6, 8, 10, 12, 14 and 16 generated according to the actuation of the actuators. The sensors 23a to 23f are mounted to the actuators, respectively. Thus, the number of sensors is the same as the number of actuators. Also, the sensors 23a to 23f are electrically connected to controller 24 so as to output a signal representing the displacement of the subject actuator to the controller 24.

On the other hand, a pair of amplifiers 25a and 25b are each electrically connected to the pilot proportional valve block 22a, 22b and the controller 24 so as to be disposed therebetween. Another amplifier 25c is electrically connected to the angle control valves 19a and 19b and the controller 24 so as to be disposed therebetween. The controller 24 is electrically connected to the positional displacement sensors 23a to 23f.

The positional displacement sensors 23a to 23f may comprise several types of known sensors. For example, the sensors 23b, 23e and 23f mounted to the dipper cylinder 8, the bucket cylinder 14 and the boom cylinder 16, respectively, each may comprise a sensor including a variable resistance potentiometer and magnetic materials so as to output an electric signal resulting from counting the number of magnetic materials. In the same manner, the sensor 23c of the swing motor 10 may comprise an absolute type encoder capable of sensing the absolute position of the upper frame with respect to the lower frame of the excavator, while the sensors 23a and 23d mounted to the travelling motors 6 and 12 each may comprise an incremental encoder.

Also, each amplifier 25a, 25b, 25c, electrically connected to the output port of the controller 24, is adapted to amplify the signal of a control value calculated in the controller 24 and output the amplified signal to the pilot valve block 22a, 22b or the inclination angle control valves 19a and 19b. In other words, electric currents generated in accordance with the handling displacement value of the control levers/pedals 21 are applied to the controller 24 which calculates control values which are amplified in the amplifiers 25a and 25b, each disposed between the controller and the pilot valve blocks 22a and 22b, and then applied to the valve blocks 22a and 22b so as to control the quantity of pilot hydraulic fluid flow outputted from the third hydraulic pump 5 to the spools of respective directional control valves 7, 9, 11, 13, 15, 17 and 18. Also, the sensors 23a to 23f each outputs a signal representing the positional displacement value of each of the actuators 6, 8, 10, 12, 14, 16 sensed thereby to the controller 24. The controller 24 calculates signals representing positional displacements of the actuators from the signals output from sensors 23a to 23f which are input to the controller, on the basis of the load on the actuators and the required quantity of hydraulic fluid flow for the actuators, so as to adjustably control the first and second main pumps 3 and 4, thereby allowing the first and second main pumps 3 and 4 to equally charge a load in case of occurrence of an overload on an actuator.

Figure 2:
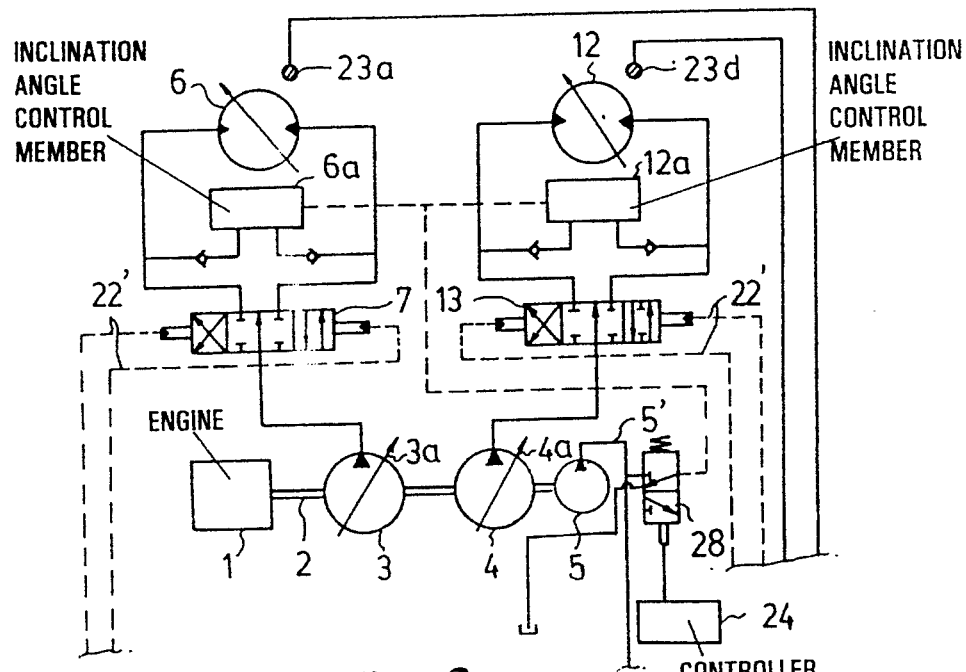
FIG. 2 is a partially enlarged circuit diagram of a travelling motor section, comprising a pair of travelling motors, of FIG. 1.

Turning next to FIG. 2 which is a partially enlarged circuit diagram of a travelling motor section of FIG. 1, the travelling motor section comprises, besides the travelling motors 6 and 12, a pair of inclination angle control members 6a and 12a each provided at each travelling motor 6, 12 for controlling the inclination angle of the travelling motor 6, 12. A solenoid valve 28 is disposed between the inclination angle control members 6a and 12a and the sub-hydraulic pump 5 for opening and closing the fluid passage of the pilot hydraulic fluid therebetween. The inclination angle control solenoid valve 28 is also electrically connected to the electronic controller 24 in order to receive a control signal therefrom.

The operation for the travelling section of FIG. 2 will be described in detail below.

Upon being handled by the operator, the control levers/pedals 21 output electric signals representing the handling values thereof to the controller 24 in order to allow the controller 24 to operate the handling values. The controller 24 then outputs electric signals resulting from the operation to the pilot valve blocks 22a and 22b by way of the first and second amplifiers 25a and 25b and also outputs other signals to the inclination angle control valves 19a and 19b by way of the third amplifier 25c. The amplifier 25c amplifies the electric signals applied thereto from the controller and then outputs the amplified signals to the inclination angle control valves 19a and 19b in order to open the pilot hydraulic passage between the sub-hydraulic pump 5 and the inclination angle control members 20a and 20b. Thus, the pilot fluid applied to the control members 20a and 20b from the sub-hydraulic pump 5 causes the inclination angles of the main pumps 3 and 4, resulting in controlling the quantity of the hydraulic fluid flow from the main pumps 3 and 4. On the other hand, upon receiving the amplified signals from the amplifiers 25a and 25b, the pilot valve blocks 22a and 22b open the pilot fluid passage between the sub-hydraulic pump 5 and the directional control valves 7 and 13 for the travelling motors 6 and 12 so that the pilot fluid is supplied from the sub-hydraulic pump 5 to the directional control valve 7. Additionally, hydraulic fluid is supplied from the main pumps 3 and 4 to the travelling motors 6 and 12 by way of the directional control valves 7 and 13 so as to drive the travelling motors 6 and 12.

The travelling motors 6 and 12 are driven by means of the hydraulic fluid from the main pumps 3 and 4. The positional sensors 23a and 23d of the motors 6 and 12 each senses the actuating velocity of the motor 6, 12 in order to output an electrical signal representing the velocity to the controller 24. Upon receiving the electrical signals from the sensors 23a and 23d, the controller 24 operates on the inputted signals and compares the operated result with a predetermined actuating velocity in order to output an electrical signal according to the comparing result to the inclination angle control valve 28 of the travelling motors 6 and 12. Thus, the control valve 28 of the travelling motors 6 and 12 opens the fluid passage of the pilot fluid in order to allow the pilot fluid to be supplied from the sub-hydraulic pump 5 to the inclination angle control members 6a and 12a of the motors 6 and 12, resulting in controlling the inclination angle of the travelling motors 6 and 12.

Figure 4:
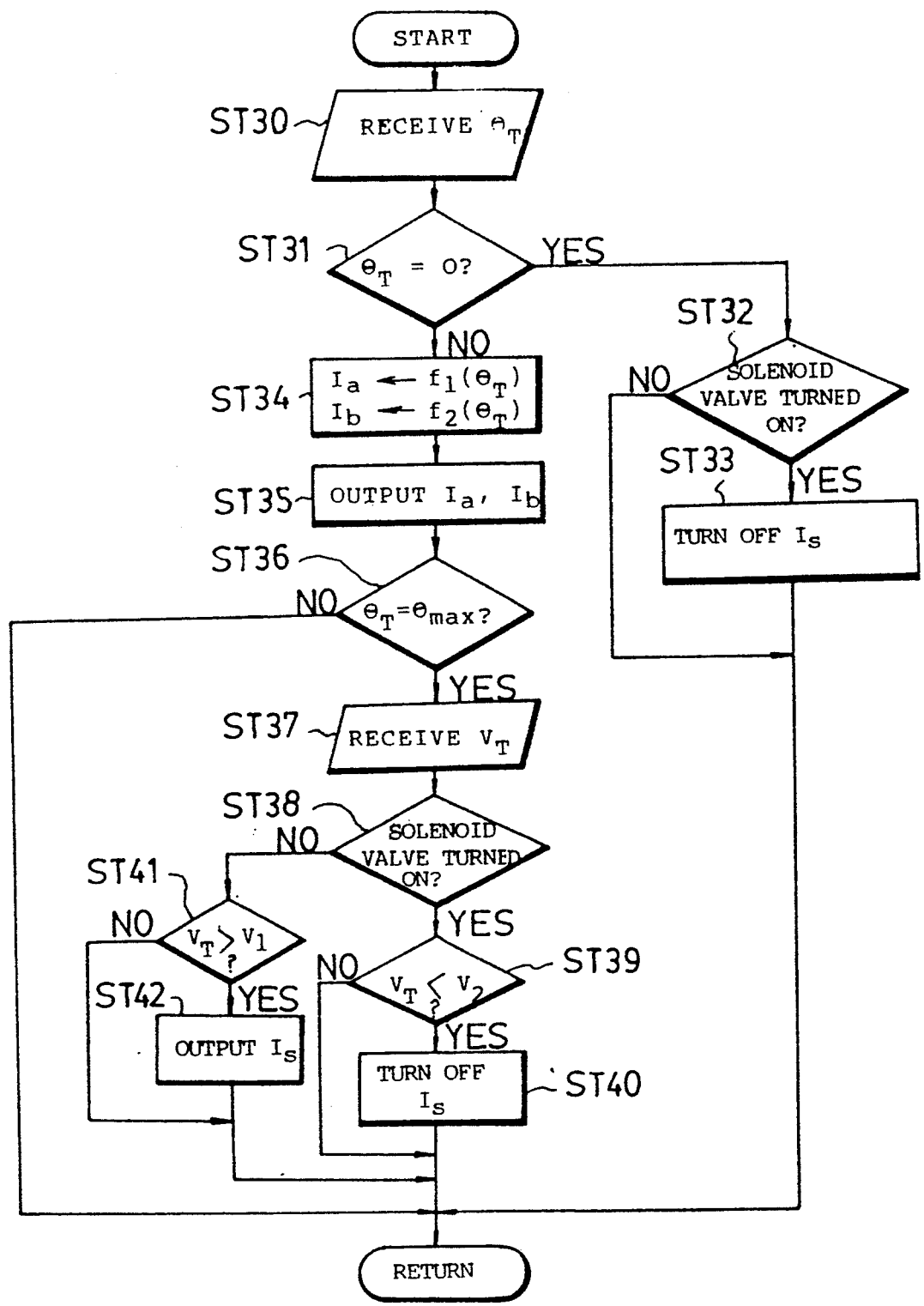
FIG. 4 is a flow chart showing a control process for accomplishing an optimal travelling operation for the travelling motors of FIG. 2.

FIG. 4 is a flow chart showing a control process for accomplishing an optimal travelling operation for the travelling motors 6 and 12 performed by the controller 24.

As described in the flow chart, the controller 24 starts the control process at a step 30 wherein the control values $\Theta_T$ of the control levers/pedals 21 are received by the controller 24 in order to be stored therein. At a next inquiry step 31, the controller 24 then determines whether the control value $\Theta_T$ is zero. If the value $\Theta_T$ is zero, it is determined at step 32 whether the inclination angle control solenoid valve 28 is applied with a current Is, which indicates whether the control circuit is turned on. If the current is applied to the solenoid valve 28, the controller 24 shuts off the current applied to the solenoid valve 28 at step 33 in order to turn off the valve 28, arid then returns to the start step.

These specified control steps (steps 32 to 33) allow the second step travelling mode to automatically return to the first step travelling mode as the second step travelling mode is accomplished.

On the other hand, if the control value $\Theta_T$ at step 31 is not zero, the process proceeds to a next step 34 wherein the controller 24 operates the control current values Ia, Ib, each for the proportional pilot valve blocks 22a and 22b and inclination angle control valves 19a and 19b in accordance with the control value $\Theta_T$. The controller 24 then outputs at step 35 the operated control current values Ia and Ib to the pilot valve blocks 22a and 22b and inclination angle control valves 19a and 19b, respectively, in order to cause the travelling motors 6 and 12 to be driven at a travelling velocity in accordance with the control value $\Theta_T$.

Thereafter, the process proceeds to a next inquiry step 36 wherein the controller 24 determines whether the control value $\Theta_T$ is a maximum value $\Theta_T$max. If the control value $\Theta_T$ is the maximum value $\Theta_T$max, the process returns to the start step, while the process simply proceeds to step 37 if the control value $\Theta_T$ is the maximum value $\Theta_T$max. At step 37, the controller 24 receives an electrical signal representing an actuating velocity of the travelling motors 6 and 12 sensed by and outputted from the sensors 23a and 23d. Thereafter at step 38, the controller 24 determines whether a current is applied to the inclination angle control solenoid valve 28, similar to the determination at step 32.

Figure 3:
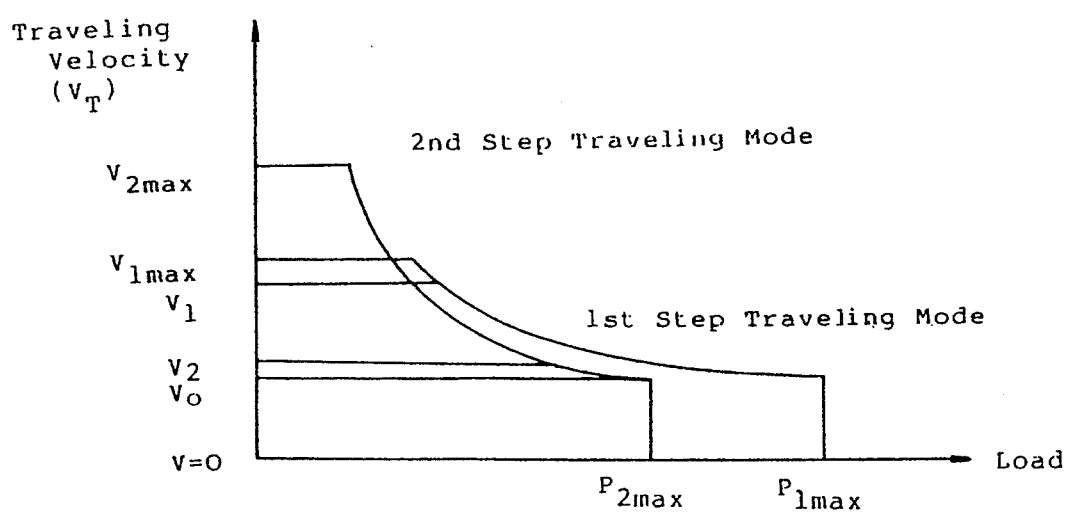
FIG. 3 is a graph showing characteristic curves of travelling velocity in first and second travelling modes of the travelling motors according to a variation of the load occurring on the travelling motors depending on a ground surface condition.

If the current is applied to the solenoid valve 28, the controller 24 determines in step 39 whether the actuating velocity $V_T$ of the travelling motors 6 and 12 is slower than an allowable minimum velocity $V_2$ in case of the second step travelling mode. As described in FIG. 3, which is a graph showing characteristic curves of travelling velocity in first and second travelling modes of the travelling motors 6 and 12 according to a variation of the load depending on a ground surface condition, the allowable minimum velocity $V_2$ is equal to a value of about 110% of a cut-off velocity $V_0$ of the travelling motors 6 and 12, that is $V_2 = 1.1 V_0$. At the cut-off velocity $V_0$, an overload occurs on the travelling motors 6 and 12, resulting in stopping the actuating of the travelling motors 6 and 12. If the actuating velocity $V_T$ is slower than the allowable minimum velocity $V_2$, the controller 24, at step 40, shuts off the current Is in order to change the travelling mode from the second step travelling mode into the first step travelling mode, thereby causing the allowable maximum load of the travelling motors 6 and 12 to be increased.

On the other hand, if the solenoid valve 28 is applied with no current at step 38, the practice travelling mode is considered as the first step travelling mode. Thus, the process proceeds to a step 41 wherein the actuating velocity $V_T$ of motors 6 and 12 are compared with a control velocity $V_1$ for the first step travelling mode. As described in FIG. 3, the control velocity $V_1$ is equal to a value of about 90% of a maximum travelling velocity $V_1$max in case of the first step travelling mode, that is $V_1 = 0.9 V_1$max. If the actuating velocity $V_T$ is equal to or slower than the control velocity $V_1$, the process simply returns to the start step. However, if the actuating velocity $V_T$ is greater than the control velocity $V_1$, it is considered that the travelling motors are applied with an adjustable load, such as due to travelling on a horizontal surface. Hence, the process proceeds to step 42, wherein the controller 24 applies a current Is to solenoid valve 28 in order to control the inclination angle of the travelling motors 6 and 12. As a result, the travelling mode of the travelling motors 6 and 12 changes from the first step travelling mode into the second step travelling mode, thereby increasing the travelling velocity of the motors 6a and 12.

Therefore, in accordance with the automatic control system of the present invention, the travelling mode of the travelling motors 6 and 12 is automatically changed between the first and second step travelling modes in the case the control levers/pedals 21 for the travelling motors 6 and 12 are at a maximum position, to efficiently correspond to the load on the travelling motors 6 and 12 depending on the ground surface condition. Thus, the control system of this invention accomplishes an efficient travelling operation of the travelling motors 6 and 12.

In addition, the present invention provides an automatic control system for efficiently controlling a braking operation for the swing motor of the excavator. The control system automatically controls the mechanical brake mechanism to apply a required adjustable braking power for the reduction gears of the swing motor section so that the braking operation is efficiently performed simultaneously without harming trouble of the reduction gears of the swing motor 10. This system is described in greater detail hereinbelow, in conjunction with the accompanying drawings.

Figure 5:
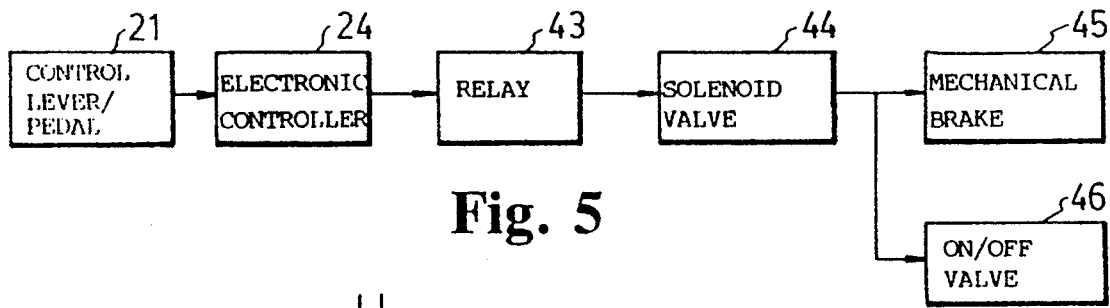
FIG. 5 is a block diagram showing a construction of an apparatus for automatically controlling the braking operation for the swing motor of the excavator in accordance with the present invention.

Referring to FIG. 5 which is a block diagram showing construction of a control apparatus of an automatic control system for performing the braking operation for the swing motor according to the present invention. The control system comprises, in addition to the electronic controller 24 of FIG. 1, the swing motor control lever 21 which is electrically connected to the controller 24. The swing motor outputs a handling value for the swing motor to the controller 24. A relay 43 is also electrically connected to the controller 24 in order to turn on or turn off a mechanical brake actuating solenoid valve 44 in accordance with the electric control signal outputted from the controller 24 and representing the handling value for swing motor 10. The solenoid valve 44 is electrically connected to the relay 43 and also to the mechanical brake 45 which is disposed at the reduction gears 6 of the swing motor section 47 (see FIG. 6) and controlled by the solenoid valve 44. In addition, an on/off valve 46 is provided in the control circuit for turning on or turning off the swing motor 10.

Figure 6:
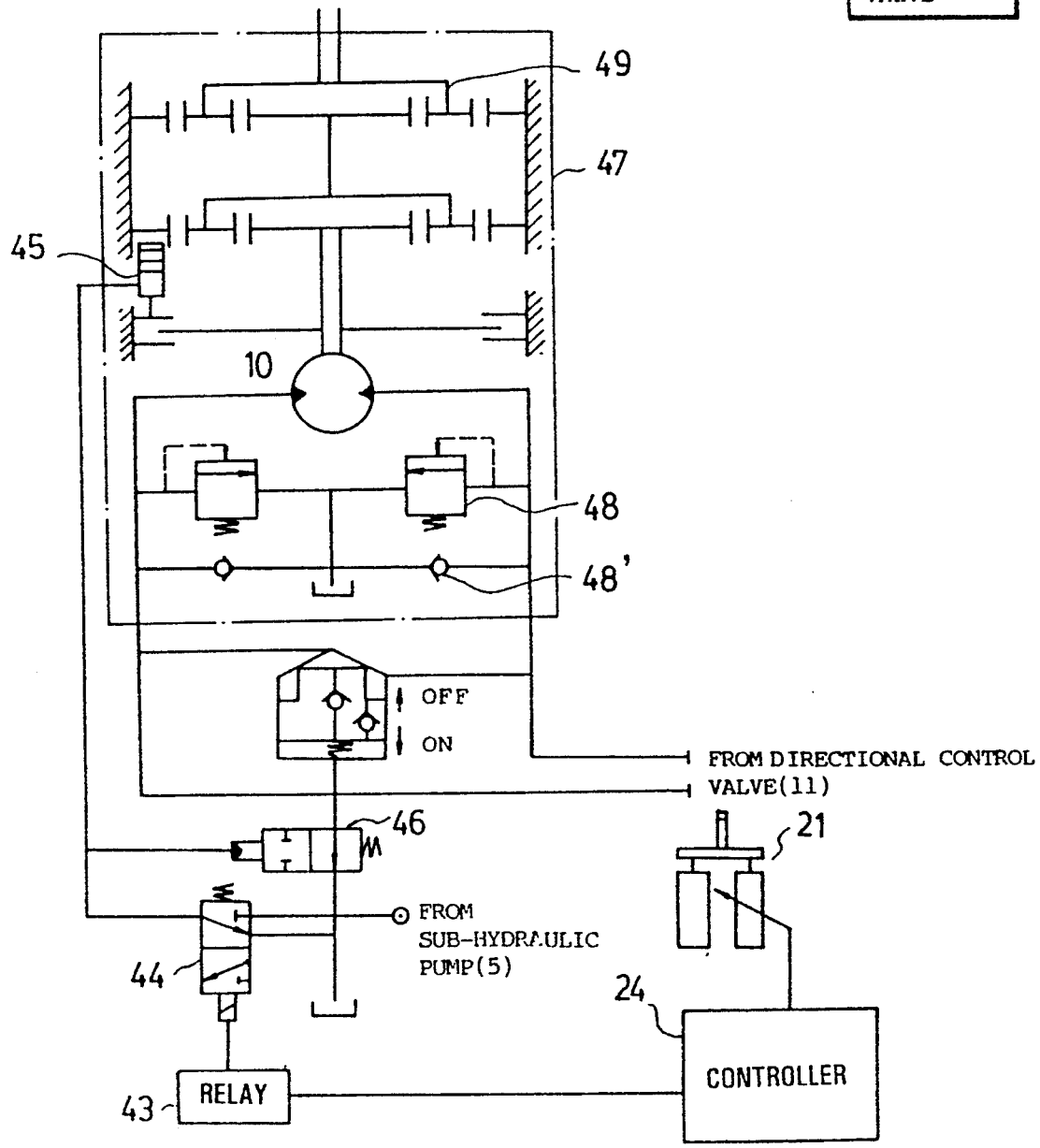
FIG. 6 is a partially enlarged circuit diagram of a swing motor section, comprising the swing motor, reduction gears, a mechanical brake and an on/off valve, of FIG. 1.

FIG. 6 is a partially enlarged hydraulic circuit diagram of the swing motor section 47. The swing motor section 47 is electrically connected to the controller 24 by way of the relay 43, the solenoid valve 44 and the on/off valve 46. Also, the solenoid valve 44 communicates with the sub-hydraulic pump 5 to receive pilot hydraulic fluid therefrom.

Turning again to the basic hydraulic circuit of FIG. 1, the swing motor section 47 is connected to the directional control valve 11, so that the quantity of the hydraulic fluid supplied from the main pumps 3 and 4 to the swing motor 10 is controlled. Referring to FIG. 6, the swing motor section 47 is provided with the swing motor 10, the reduction gears 49 adapted to reduce the swinging velocity of the swing motor 10 as demanded, and a pair of check valves 48' and a pair of sub-valves 48 disposed between the swing motor 10 and the directional control valve 11 in parallel. In addition, the mechanical brake 45 is disposed at the reduction gears 49 in order to apply a braking power to the reduction gears 49 as the solenoid valve 44 is turned on in accordance with a braking signal from controller 24.

If the control lever 21 is positioned at the swing position during operation of the control apparatus of the above construction, the controller 24 controls the mechanical brake 45 to be released from the braking state for the reduction gears 49 simultaneously with turning on the on/off valve 46 so that the swing motor 10 is driven. This causes the upper frame of the excavator to be turned with respect to the lower frame.

During such a driving state of the swing motor 10, the operator moves the control lever 21 for the swing motor 10 to the neutral position, resulting in stopping the driving state of the swing motor 10. However, the swing motor 10 temporarily continues, by virtue of the swinging inertia force of the upper frame of the excavator. The swinging state of the upper frame is therefore maintained in spite of the positional change of the control lever 21. Thus, if the mechanical brake 45 is immediately driven in order to apply braking power to the reduction gears 49 after positional change of the control lever 21 from the swing state to the neutral state, brake 45 may break down due to the torque of the upper frame of the excavator, which the brake 45 is incapable of handling.

On the contrary, if the position of the control lever 21 is changed from the neutral position to the swing position in order to change the braking state of the swing motor section 47 into the swinging state, the braking of the reduction gears 49 by the brake 45 has to be immediately released. Otherwise, the reduction gears 49 may be broken due to the braking power of brake 45.

Therefore, the control system of the present invention delays actuation of the mechanical brake 45 for about 5 seconds after a positional change of the control lever 21 from the swinging position to the neutral position. At this time, the swinging velocity of the swing motor section 47 is gradually reduced to a lower level by virtue of a relative hydraulic reaction of the hydraulic fluid thereof. In the case of a positional change of the control lever 21 from the braking state to the swing state, the control system of this invention controls the mechanical brake 45 to release the braking state thereof for the reduction gears 49, immediately. In this embodiment, the mechanical brake 45 is controlled to release the braking power thereof from the reduction gears 49 within 0.1 second after the positional change of the control lever 21.

The operational effect of this control system will be described in more detail, in conjunction with FIGS. 7A and 7B, which are graphs showing the relation between the handling of the swing motor control lever 21 and the mechanical brake 45 during an operation of the swing motor section 47.

As shown in the FIG. 7A, the swing motor control lever 21 is conventionally handled (the inclined ascending line) in order to be changed from the neutral position to the swing position, resulting in initiating the swinging state of the swing motor section 47, then maintained (the horizontal line) at the swing position for a time, and again handled (the inclined descending line) in order to be changed from the swing position to the neutral position, resulting in stopping the swinging state of the swing motor section 47.

At this time, the mechanical brake 45 is driven in the manner described in FIG. 7B in order to correspond to the above handling states of the control lever 21. In other words, the brake 45 is sequentially controlled to release (the vertical ascending line) the braking power thereof having been applied for the reduction gears 49 of the swing motor section 47 within 0.1 second after the positional change of the control lever 21 from the neutral position to the swing position. The braking power is then maintained (the horizontal line) in the releasing state for a time, and continues (the continued horizontal line) in the releasing state for about 5 seconds after positional change of the control lever 21 from the swing position to the neutral position. This causes the swinging velocity of the swing motor section 47 to be gradually reduced to a lower level, by virtue of the hydraulic reaction of the hydraulic fluid of the section 47, thereafter to be driven (the vertical descending line) by the relay 34 and the solenoid valve 44 in order to apply the braking power to the reduction gears 49 after lapsing of the 5 seconds. This results in complete stopping of the swing motor section 47.

The control process for automatically controlling the brake mechanism for the swing section 47 will be described in conjunction with a flow chart of FIG. 8.

As shown in the flow chart, the process starts at a first step 50 wherein the controller 24 determines whether the output value from the control lever 21 for the swing motor 10 is an increasing value, representing the positional change of the lever 21 from the neutral position to the swing position, or a reducing value, representing the positional change of the lever 21 from the swing position to the neutral position. If the output value from the lever 21 is an increasing value, the process simply proceeds to step 51, whereas the process proceeds to an inquiry step 52 in case of a lowering output value.

At the step 51, the controller 24 outputs an electrical signal to the relay 43 in order to shut off the control circuit, resulting in turning off the solenoid valve 44. Thus, the mechanical brake 45 releases the braking power for the reduction gears 49 of the swing motor section 47 within 0.1 second after a positional change of lever 21, and the on/off valve 46 is turned on so as to allow the hydraulic fluid to be supplied from the main pumps 3 and 4 to the swing motor 10 by way of the directional control valve 11, thereby driving the swing motor 10.

On the other hand, the controller 24 determines at step 52 whether 5 seconds have lapsed since the control lever 21 was handled in order to be changed from the swing position to the neutral position. If the 5 seconds have elapsed, the process proceeds to step 53. However, if the 5 seconds have not elapsed, the controller 24 repeatedly performs the inquiry step 52 until it is determined that 5 seconds has elapsed. At step 53, the controller 24 outputs an electric signal to the relay 43 to cause the solenoid valve 44 to allow the mechanical brake 45 to be driven so that the braking power of the brake 45 is applied to the reduction gears 49 simultaneously with turning off the on/off valve 46 in order to stop the swinging state of the swing motor 10.

Therefore, the control system of this invention automatically controls the brake mechanism for the swing motor section 47 in order to be efficiently actuated by the controller 24 in accordance with the handling value for the swing motor control lever 21. The system accomplishes an efficient control of the braking operation for the swing motor section 47 without harming the swing motor section 47 of the excavator.

In addition, the present invention provides a control system for efficiently controlling a relative velocity of the swing motor 10 and the boom cylinder 16 if the control levers 21 for the swing motor 10 and the boom cylinder 16 are actuated at the same time the present invention lifts the boom simultaneously with swinging the upper frame of the excavator with respect to the lower frame. In accordance with this control system, the swinging velocity of the swing motor 10 with respect to the lifting velocity of the boom is selectively controlled by the operator taking account of the operational condition, so that the relative velocity between the swing motor 10 and the boom cylinder 16 can be automatically and efficiently controlled. Thus, the swinging of the swing motor 10 and the ascending of the boom are smoothly and continuously performed with respect to each other. This control system is described in more detail hereinbelow, in conjunction with the accompanying drawings.

Figure 9:
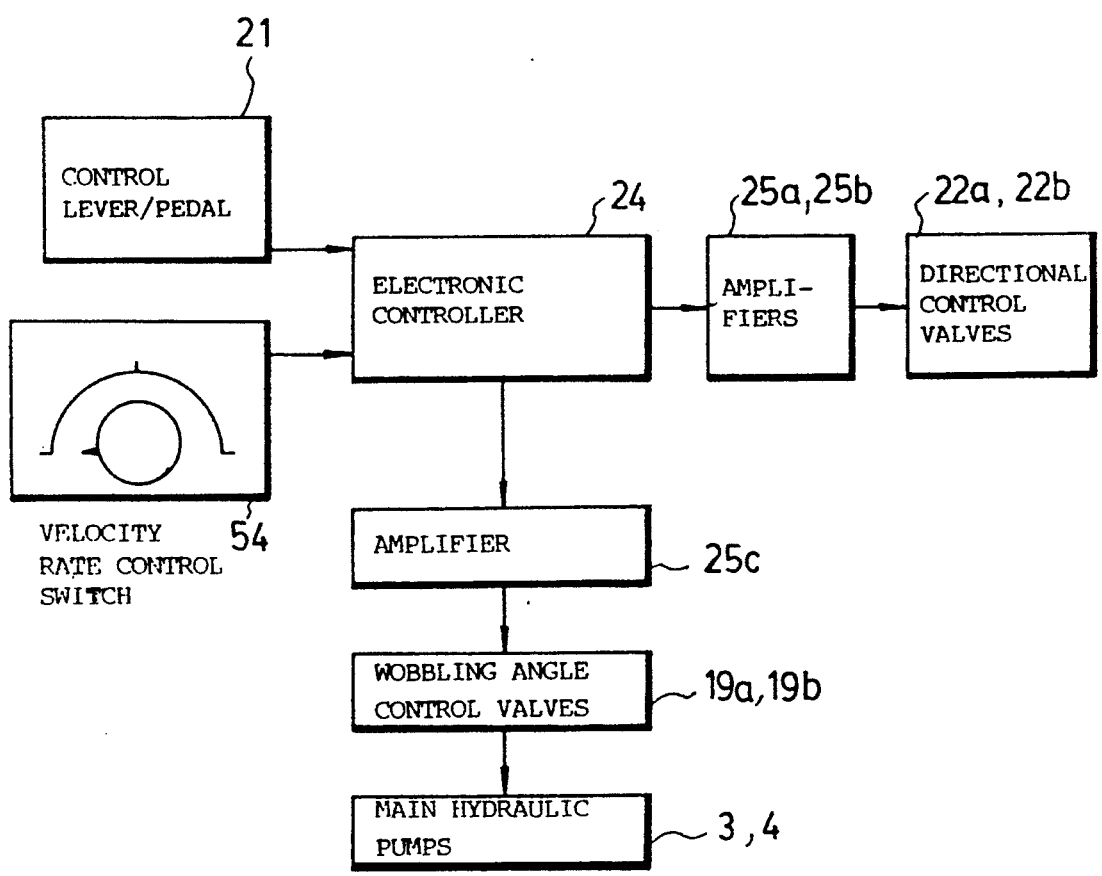
FIG. 9 is a block diagram showing a construction of an apparatus, including a velocity rate control switch electrically connected to the electronic controller of FIG. 1, for automatically controlling a relative velocity rate between the swing motor and the boom cylinder in accordance with the present invention.

Referring to FIG. 9, which is a block diagram showing a construction of the control apparatus for automatically controlling the relative velocity between the swing motor 10 and the boom cylinder 16, the apparatus is provided with the controller 24 including a ROM, a RAM and a CPU. The controller 24 is electrically connected at its input port to the control levers/pedals 21 and a relative velocity rate control switch 54, adapted for automatically controlling a relative velocity between the swing motor 10 and the boom cylinder 16. On the other hand, the output port of controller 24 is electrically connected to the amplifiers 25a to 25c and the proportional pilot valve blocks 22a and 22b. Thus, the control levers/pedals 21 are electrically connected to the pilot valve blocks 22a and 22b by way of the controller 24.

As described above, the relative velocity control switch 54 is electrically connected to the controller 24. Thus, the control switch 54 outputs an electric signal to the controller 24. The electric signal represents a setting value $\Theta c(=V_B/V_S)$, previously set by the operator by setting the ascending/descending velocity $V_B$ (hereinafter, referred to simply as "the ascending velocity $V_B$) of the boom with respect to the swinging velocity $V_S$ of the swing motor 10 by means of the switch 54.

On the other hand, upon receiving electrical signals of the handling values $\Theta i$ ($\Theta_B$ and $\Theta_S$) from the control levers/pedals 21 for the boom cylinder 16 and the swing motor 10 and another electrical signal of the setting value $\Theta c(=V_B/V_S)$ from the control switch 54, the controller 24 operates the values $\Theta i(\Theta_B, \Theta_S)$ and $\Theta c(=V_B/V_S)$ and then outputs control signals to the amplifiers 25a to 25c. The amplifiers 25a to 25c then amplify the signals from the controller 24, and apply the amplified signals to the proportional pilot valve blocks 22a and 22b and the inclination angle control valves 19a and 19b, respectively. In other words, an electric signal corresponding to the handling values $\Theta i(\Theta_B, \Theta_S)$ for the actuators 10 and 16 are output from controller 24 to the first and second amplifiers 25a and 25b in order to be amplified therein and then applied to the pilot valve blocks 22a and 22b. Thus, it is possible to allow the pilot valve blocks 22a and 22b to control the pilot hydraulic fluid supplied from the sub-hydraulic pump 5 to the spools of the directional control valves 11 and 17 for the actuators 10 and 16. In the same manner, the other electric signal corresponding to the setting value $\Theta c(V_B/V_S)$ of the control switch 54 is outputted from the controller 24 to the third amplifier 25c in order to be amplified therein and then applied to the inclination angle control valves 19a and 19b so that the inclination plates 3a and 4a of the main pumps 3 and 4 are controlled by the control members 20a and 20b, thereby causing the quantity of the hydraulic fluid flow from the main pumps 3 and 4 to be adjustably controlled.

Figure 10:
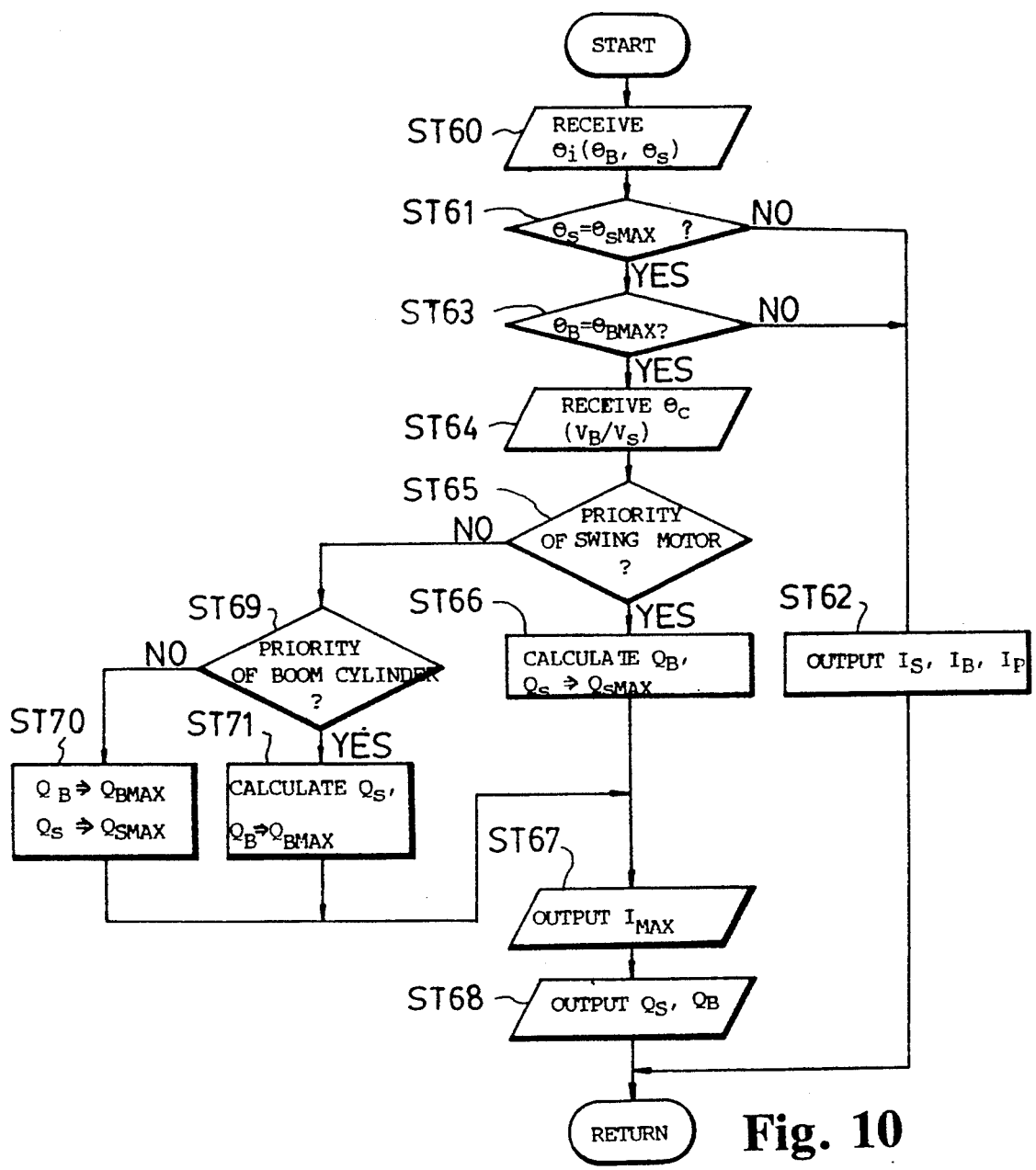

FIG. 10 is a flow chart showing the automatic control process for controlling the relative velocity between the swing motor 10 and the boom cylinder 16 in the case of a hydraulic circuit without a cross hydraulic fluid line 27a (see FIG. 1) between the directional control valves 11 and 17 for the swing motor 10 and the boom cylinder 16, respectively.

The operator first sets, by means of the control switch 54, the ascending velocity $V_B$ of the boom with respect to the swinging velocity $V_S$ of the swing motor 10, taking account of the swinging angle $\Theta$ of the swing motor 10 and the ascending height H of the boom depending on a given ground surface condition. A setting value $\Theta c(V_B/V_S)$ of the control switch 54 is thereby obtained. Upon accomplishing the above setting operation for the value $\Theta c(V_B/V_S)$ of the control switch 54, the control process represented in the flow chart of FIG. 10 will be performed by the controller 24.

Figure 12A:
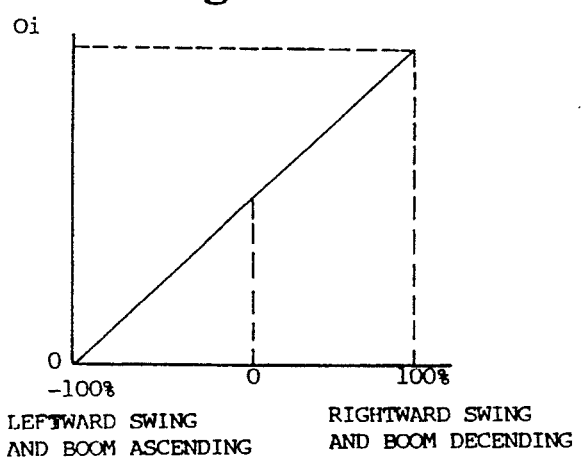
FIGS. 12A and 12B are graphs showing characteristic curves of electric current generated in accordance with the handling values for the control levers/pedals of the swing motor and the boom cylinder.
Figure 12B:
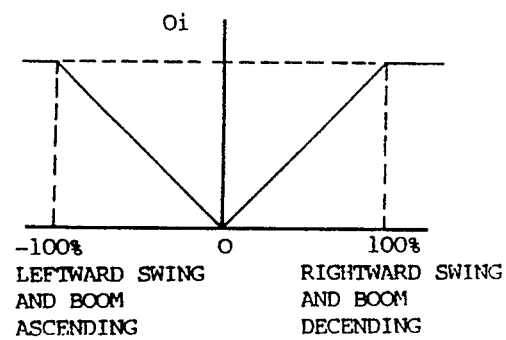

According to the above flow chart, the control process starts at a step 60, wherein the controller 24 receives the electric signals representing the handling values $\Theta_B$ and $\Theta_S$ for the boom cylinder 16 and the swing motor 10 from the control levers/pedals 21. In this case, if the variation of the handling values $\Theta i$ ($\Theta_B$, $\Theta_S$) for the boom cylinder 16 and the swing motor 10 is represented as a linear proportional function as described in the graph of FIG. 12A, the handling values $\Theta i$ ($\Theta_B$, $\Theta_S$) are converted into a linear symmetrical function as described in the graph of FIG. 12B by means of conventional converting software previously programmed in the controller 24.

Thereafter, the controller 24 determines at a step 61 whether the handling value $\Theta_S$ for the swing motor 10 is a maximum value $\Theta_S$ max. If the value $\Theta_S$ is not the maximum value $\Theta_S$ max, the process proceeds to a step 62 wherein the controller 24 operates the handling values $\Theta i$ ($\Theta_B$, $\Theta_S$) in order to obtain control values for the spools of the directional control valves 11 and 17 of the swing motor 10 and the boom cylinder 16, respectively. Thereafter, the controller 24 outputs current values $I_s$ and $I_B$ corresponding to the obtained control values for the spools of the directional control valves 11 and 17 to the pilot valve blocks 22a and 22b by way of the first and second amplifiers 25a and 25b, thereby causing the directional control valves 11 and 17 to be controlled. In addition, the controller 24 calculates the quantity of the hydraulic fluid flow $Q_1$ and $Q_2$ which is to be output from the main pumps 3 and 4. The controller 24 then outputs an electrical signal of the current value $I_p$, representing the calculated quantity of the fluid flow $Q_1$ and $Q_2$, to the inclination angle control valves 19a and 19b by way of the third amplifier 25c in order to control the inclination angle of the main hydraulic pumps 3 and 4. As a result, the swing motor 10 and the boom cylinder 16 are actuated by memos of the hydraulic fluid output from the main pumps 3 and 4.

On the other hand, if it is determined at step 61 that the value $\Theta_S$ is the maximum value $\Theta_S$ max, the process proceeds to step 63 wherein the controller 24 determines whether the handling value $\Theta_B$ for the boom cylinder 16 is a maximum value $\Theta_B$ max. If the value $\Theta_B$ is not the maximum value $\Theta_B$ max, the process proceeds to a step 62 as described in the description of step 61. However, if the value $\Theta_B$ is the maximum value $\Theta_B$ max, the process proceeds to a step 64 wherein the controller 24 receives the setting value $\Theta c(V_B/V_S)$ from the control switch 54. Thereafter, the controller 24 proceeds to a step 65 in order to determine whether the setting value $\Theta c(V_B/V_S)$ of the control switch 54 represents that the swing motor 10 is to be actuated prior to the boom cylinder 16. If the swing motor 10 is to be actuated prior to the boom cylinder 16, the process proceeds to a step 66 wherein the controller 24 calculates the quantity of hydraulic fluid flow $Q_B$ for the boom cylinder 16 simultaneously with setting the quantity of the hydraulic fluid flow $Q_S$ for the swing motor 10 at a maximum value $Q_S$ max. The actuating of the swing motor 10 and the boom cylinder 16 in accordance with the setting value $\Theta c(V_B/V_S)$ of the control switch 54 is thereby accomplished. Thereafter, the controller 24 performs a step 67.

However, if the swing motor 10 is not to be actuated prior to the boom cylinder 16, the process proceeds to a step 69. In that step, the controller 24 determines whether the setting value $\Theta c(V_B/V_S)$ of the control switch 54 represents that the boom cylinder 16 is to be actuated prior to the swing motor 10. If the boom cylinder 16 is not to be actuated prior to the swing motor 10, the actuating velocity $V_S$ and $V_B$ of the swing motor 10 and the boom cylinder 16 are treated as if they were set by the control switch 54 to be the same. Therefore, the controller 24 sets, at step 70, control current values in order to make the quantity of the hydraulic fluid flow $Q_B$ and $Q_S$ for the boom cylinder 16 and the swing motor 10 to be commonly set as the maximum values $Q_B$ max and $Q_S$ max.

However, if the boom cylinder 16 is to be actuated prior to the swing motor 10, the controller 24 calculates the quantity of the hydraulic fluid flow $Q_S$ for the swing motor 10 simultaneously with setting the quantity of the hydraulic fluid flow $Q_B$ for the boom cylinder 16 as a maximum value $Q_B$ max, at step 71. The actuating of the swing motor 10 and the boom cylinder 16 in accordance with the setting value $\Theta c(V_B/V_S)$ of the control switch 54 is thereby accomplished. Thereafter, the controller 24 performs step 67.

At step 67, the controller 24 outputs a maximum current value Imax to the pilot valve blocks 22a and 22b in order to make the spools of the directional control valves 11 and 17 of the swing motor 10 and the boom cylinder 16 fully opened to a maximum extent. Thereafter, the process proceeds to a step 68 wherein the controller 24 outputs an electric signal to the inclination angle control valves 19a and 19b by way of the third amplifier 25c, for controlling the inclination angle of the main pumps 3 and 4 in order to satisfy the results of the steps 66, 70 and 71. Hence, the inclination angles of main pumps 3 and 4 are adjustably controlled so as to output the desired quantity of the hydraulic fluid flow capable of accomplishing the operations of the swing motor 10 and the boom cylinder 16 according to the setting value $\Theta c(V_B/V_S)$ of the control switch 54.

Figure 11:
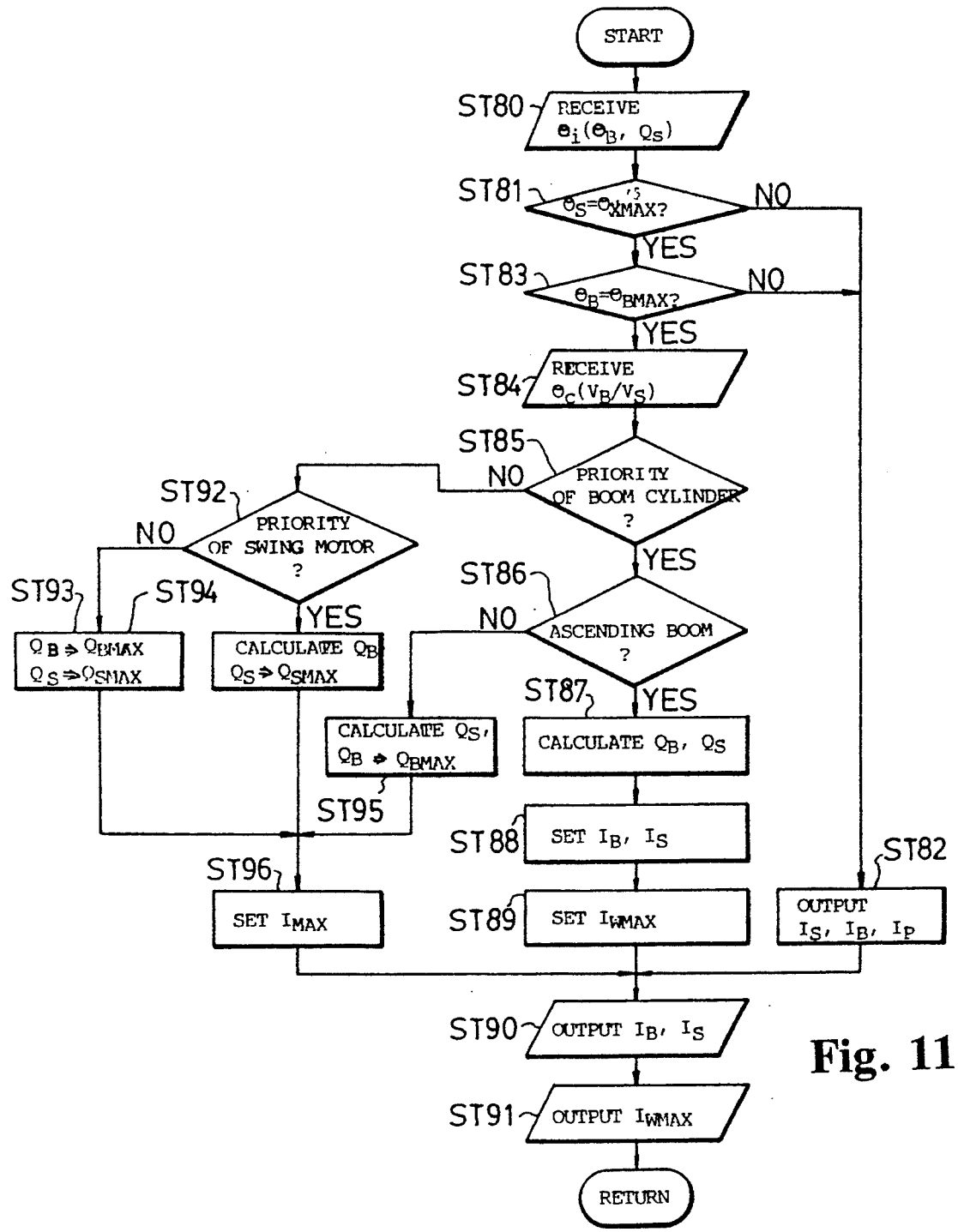

Turning next to a flow chart of FIG. 11, this flow chart describes a control process corresponding to the process of FIG. 10, but shows a process for the case of a hydraulic circuit provided with a cross hydraulic fluid line 27a including a two port directional control solenoid valve 27d (see FIG. 1) and connected between respective directional control valves 11 and 17 of the swing motor 10 and the boom cylinder 16. Therefore, in this hydraulic circuit which is to be controlled by the control process of FIG. 11, each quantity of the hydraulic fluid flow output from each main pump 3, 4 can be joined at an actuator 10, 16 by way of the cross line 27a in order to efficiently charge an overload occurring on the actuator 10, 16.

As described in the flow chart of FIG. 11, this second control process is similar to the process of FIG. 10.

In this process, steps 80 to 84 are the same as steps 60 to 64 of the control process of FIG. 10. Therefore, the process of steps 80-84 corresponds to the description of steps 60-64 in FIG. 10, and will not be described again herein. As shown in the flow chart of FIG. 11, the controller 24 determines at an inquiry step 85 whether the setting value $\Theta c(V_B/V_S)$ of the control switch 54 represents the boom cylinder 16 is to be actuated prior to the swing motor 10. If the boom cylinder 16 is to be actuated prior to the swing motor 10, the controller 24 performs step 86 wherein it is determined whether the boom cylinder 16 is to be controlled to ascend or descend. If the boom cylinder 16 is to be controlled to descend, the process proceeds to step 95 wherein controller 24 calculates the quantity of hydraulic fluid flow $Q_S$ for the swing motor 10 simultaneously with setting the quantity of hydraulic fluid flow $Q_B$ for the boom cylinder 16 as the maximum value $Q_B max$, thereby accomplishing the actuating of swing motor 10 and boom cylinder 16 in accordance with the setting value $\Theta c(V_B/V_S)$ of the control switch 54. Thereafter, the controller 24 performs step 96. However, if the boom cylinder 16 is to be controlled to ascend, the process proceeds to step 87 wherein the controller 24 calculates the quantity or the hydraulic fluid flow $Q_S$ and $Q_B$ for the swing motor 10 and the boom cylinder in accordance with the setting value $\Theta c(V_B/V_S)$. Thereafter, the controller 24 performs step 88 wherein the control values $I_S$ and $I_B$ for the spools of the directional control valves 11 and 17 are set in accordance with the hydraulic fluid flow $Q_S$ and $Q_B$. The controller 24 then performs step 89, wherein the controller 24 operates a maximum control value Iwmax for controlling the inclination angle control valves 19a and 19b to maximize the inclination angle of the main pumps 3 and 4.

On the other hand, at step 85, if it is determined that the boom cylinder 16 is not to be actuated prior to the swing motor 10, the controller 24 performs a step 92 wherein it is determined whether the setting value $\Theta c(V_B/V_S)$ of the control switch 54 represents that the swing motor 10 is to be actuated prior to the boom cylinder 16. If the swing motor 10 is to be actuated prior to the boom cylinder 16, the process proceeds to a step 71 wherein the controller 24 calculates the quantity of hydraulic fluid flow $Q_B$ for the boom cylinder 16 simultaneously with setting the quantity of hydraulic fluid flow $Q_S$ for the swing motor 10 at the maximum value $Q_S max$. The actuating of the swing motor 10 and the boom cylinder 16 is thereby accomplished in accordance with the setting value $\Theta c(V_B/V_S)$ of the control switch 54. Thereafter, the controller 24 performs step 96.

However, if the swing motor 10 is not to be actuated prior to the boom cylinder 16, the process proceeds to a step 93 wherein the controller 24 sets a control value in order to make the quantity of the hydraulic fluid flow $Q_B$ and $Q_S$ for the boom cylinder 16 and the swing motor 10 to be set to maximum values $Q_B max$ and $Q_S max$. Thereafter, the process proceeds to step 96. At step 96, controller 24 sets a maximum control value Imax for making the pilot valve blocks 22a and 22b control the spools of the directional control valves 11 and 17 of the swing motor 10 and the boom cylinder 16 to be fully opened.

Thereafter, the process proceeds to a step 90 wherein the controller 24 outputs electrical signals of the control values $I_S$ and $I_B$ for the spools of the directional control valves 11 and 17 to the pilot valve blocks 22a and 22b by way of the first and second amplifiers 25a and 25b, thereby controlling the directional control valves 11 and 17 of the swing motor 10 and the boom cylinder 16. The controller 24 then outputs electric signals of the required quantity of the hydraulic fluid flow $Q_S$ and $Q_B$ resulting from the step 89, 93, 94 or 95 to the inclination angle control valves 19a and 19b by way of the third amplifier 25c, thereby causing the wobbling angles of the main pumps 3 and 4 to be controlled by the wobbling angle control members 20a and 20b. Thus, the quantity of the fluid flow of the main pumps 3 and 4 for the swing motor 10 and the boom cylinder 16 is efficiently controlled, thereby accomplishing the actuating of swing motor 10 and the boom cylinder 16 in accordance with the setting value $\Theta(V_B/V_S)$ of the control switch 54.

Figure 12C:
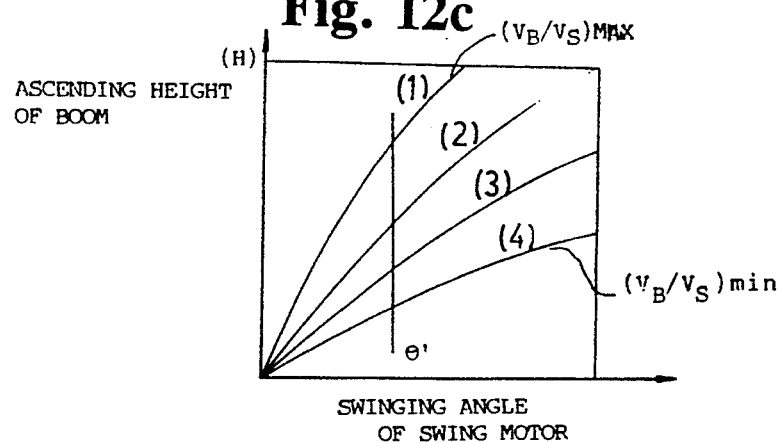
FIG. 12C is a graph showing several characteristic curves of lifting height of the boom with respect to swinging angle of the swing motor according to each relative velocity rate between the swing motor and the boom cylinder determined by the setting value by the control switch of FIG. 9.

Additionally, FIG. 12C is a graph showing several characteristic curves of ascending height H of the boom with respect to swinging angle $\Theta$ of the swing motor 10 according to each setting value $\Theta c(V_B/V_S)$ of the control switch 54. As shown in the drawing, the ascending height H with respect to the swing angle $\Theta$ increases in proportion to the setting value $\Theta(V_B/V_S)$, such that the height H of the boom in the case of accomplishing a swinging to a certain swinging angle $\Theta'$ of the swing motor 10 is the highest in case of a maximum setting value $\Theta(9(V_B/V_S)$ described at the secondary functional curve (1) of FIG. 12c, but the lowest in the case of a maximum setting value $\Theta(V_B/V_S)$ described at another secondary functional curve (4).

Therefore, the control system of this invention automatically controls the operation of the swing motor 10 and the boom cylinder 16 in order to efficiently accomplish a synchronous operation thereof by setting a relative actuating velocity between the swing motor 10 and the boom cylinder 16 using the control switch 54. This permits the swinging under the control of swing motor 10 and the ascending of the boom to be smoothly and continuously preformed at the same time.

The present invention also provides a process for controllably preventing the generation of impact in the operation of the actuators. As apparent from FIG. 1, which shows a basic hydraulic circuit according to the present invention, the electronic controller 24 controls respective operations of actuators 6, 8, 10, 12, 14 and 16 by sending respective electric control signals to electronic proportional valves 22a and 22b and solenoid valves and inclination angle control valves 19a and 19b, via amplifiers 25a, 25b, and 25c, on the basis of respective manipulation mounts $\Theta i$ of the control levers/pedals 21 for the actuators. Respective spools of directional control valves 7. 19, 11, 13, 15, 17 and 18 of the actuators are then moved according to the electric signals. The controller 24 also controls respective amounts of hydraulic fluid to be supplied to the actuators by controlling respective inclination angles of hydraulic pumps 3 and 4.

That is, the controller 24 receives respective signals from the control levers/pedals 21 and respective displacement signals from positional sensors provided at the actuators, all of which signals are based on the manipulation amounts $\Theta i$, and controls respective operations of electronic proportional valve blocks 22a and 22b and inclination angle control valves 19a and 19b on the basis of the signals. Hydraulic fluid is thus supplied to the actuators in an amount corresponding to the control curve of optimum hydraulic fluid flow rate to prevent the actuators from being subjected to impact.

Figure 13:
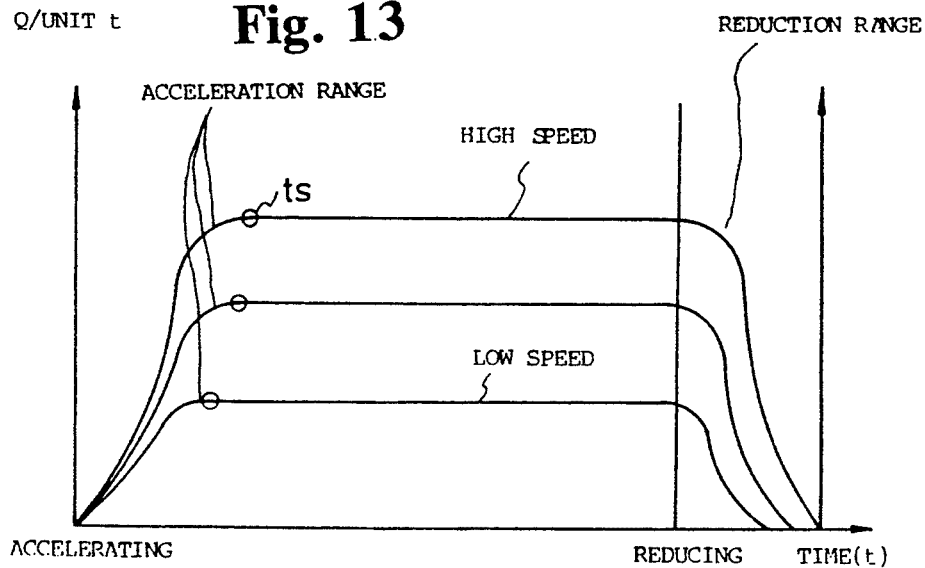
FIG. 13 is a graph showing characteristic curves of quantity of hydraulic fluid flow per unit time with respect to actuating time in accordance with an optimal control process for preventing a mechanical shock occurring on the actuators according to the present invention, especially showing a difference of the quantity of the fluid flow between higher and lower speed actuation of the actuators and also showing a variation of the quantity of the fluid flow in speed accelerating condition and speed reducing condition.

The control curve of optimum hydraulic fluid flow rate shown in FIG. 13 has been obtained from tests. The curve depicts the variation of hydraulic fluid flow rate per hour in the actuators, with respect to the time t. The variation of hydraulic fluid flow rate during the operation of actuators at high velocity will now be explained with reference to FIG. 13. At the acceleration range from the point where the acceleration is initiated to the point $t_s$, the flow rate of hydraulic fluid is gradually increased, so as to prevent the actuators from being subjected to impact. At the reduction range, that is as the actuators operate in opposite direction, the flow rate of hydraulic fluid is also gradually increased in opposite direction since the direction of the flow of hydraulic fluid is opposite, so as to prevent the actuators from being subjected to impact.

Figure 14:
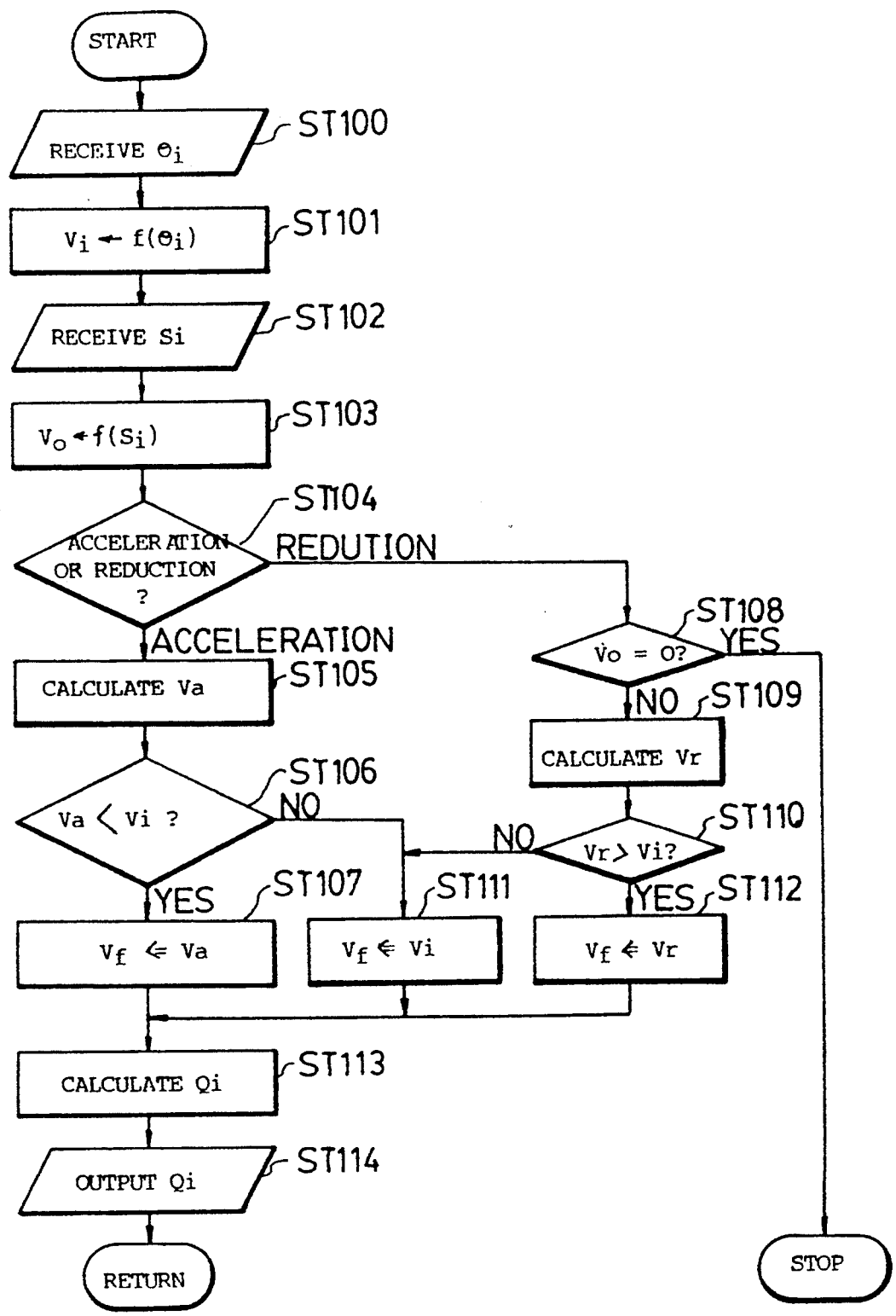
FIG. 14 is a flow chart showing an automatic control process for preventing mechanical shock between the actuators and the hydraulic fluid, in accordance with the present invention.

Now, the process for preventing the actuators from being subjected to impact, carried out by the electric controller 24 in accordance with the present invention will be described in conjunction with the flowchart of FIG. 14.

At step 100, the controller 24 receives electric signals corresponding to respective manipulation amounts $\Theta i$ for actuators 6, 8, 10, 12, 14 and 16 from the control levers/pedals 21. Then, the respective predetermined velocities Vi of the actuators are operated on the basis of respective manipulation amounts Qi from the control levers/pedals 21, at step 101. At step 102, the controller 24 also receives respective current operational positions Si of the actuators from sensors 23a to 23f. Thereafter, respective optimum operation velocities Vo of the actuators are operated on the basis of respective predetermined velocities Vi and respective operation positions Si of the actuators, at the step 103. It is determined at the step 104, whether the operation states of control levers/pedals 21 are acceleration states or reduction state. If the operation state of control levers/pedals 21 is acceleration states, the procedure proceeds to the step 105. If the operation states of control levers/pedals 21 are reduction states, the procedure proceeds to the step 108.

First, the procedure for the acceleration state of control levers/pedals 21 will be described.

At the step 105, respective optimum acceleration velocities Va are calculated on the basis of the standard acceleration curve of FIG. 13. Thereafter, it is determined at step 106 whether each acceleration velocity Va is lower than the corresponding predetermined velocity Vi. If each acceleration velocity Va is lower than the corresponding predetermined velocity Vi, the procedure proceeds to the step 107. On the other hand, when each acceleration velocity Va is equal to or higher than the corresponding predetermined velocity Vi, the procedure proceeds to the step 111. At step 107, the output velocity Vf is set to each optimum acceleration velocity Va obtained at the step 105. At step 111, the output velocity Vf is set to each predetermined velocity Vo.

On the other hand, it is determined at the step 108 whether the operation velocity of each actuator is zero. If each operation velocity is zero, the process is completed. If each operation velocity is zero, the procedure proceeds to step 109. Thereafter, each optimum reduction velocity Vr based on the reduction curve of FIG. 13 is calculated at step 109. It is determined at the step 110 whether each optimum reduction velocity Vr is higher than the corresponding predetermined velocity Vi. If each optimum reduction velocity Vr is higher than the corresponding predetermined velocity Vi, the procedure proceeds to step 112. If not, the procedure proceeds to step 111.

At step 111, each output velocity Vf is set to the predetermined velocity Vo, as in the case of acceleration. At step 112, each output velocity Vf is set to the optimum reduction velocity Vr.

At the step 113, respective output values Qi corresponding to flow rates of hydraulic fluid are calculated on the basis of the corresponding output velocities Vf obtained at steps 107, 111, and 112. The calculated output values Qi are sent to main hydraulic pumps 3 and 4 to supply the corresponding amount of hydraulic fluid to the pumps. Therefore, respective flows of hydraulic fluid supplied to the actuators are properly controlled, in the acceleration or reduction of the actuators, thereby preventing the actuators from being subjected to impact which may be caused by a sudden flowing of hydraulic fluid or a reversal of the direction of hydraulic fluid flow.

Figure 15:
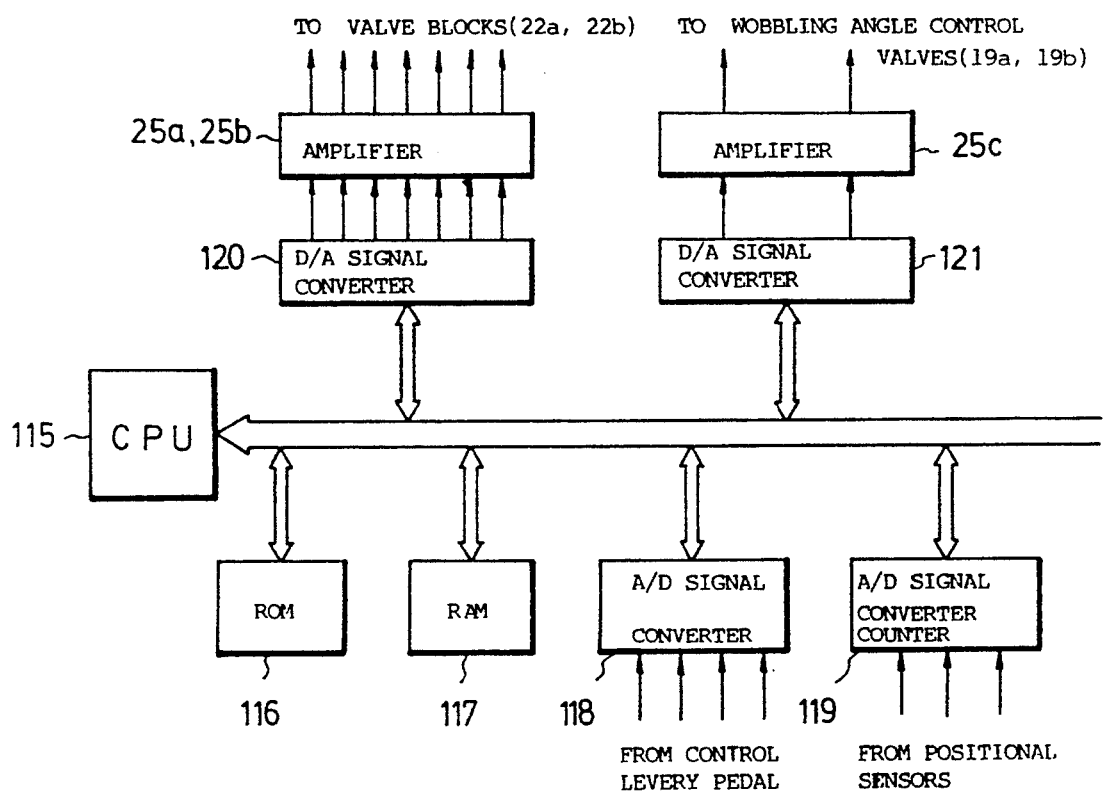
FIG. 15 is a block diagram showing the construction of an electronic controller of an apparatus for automatically controlling the cushion of the cylinder actuators in accordance with the present invention.
Figure 17:
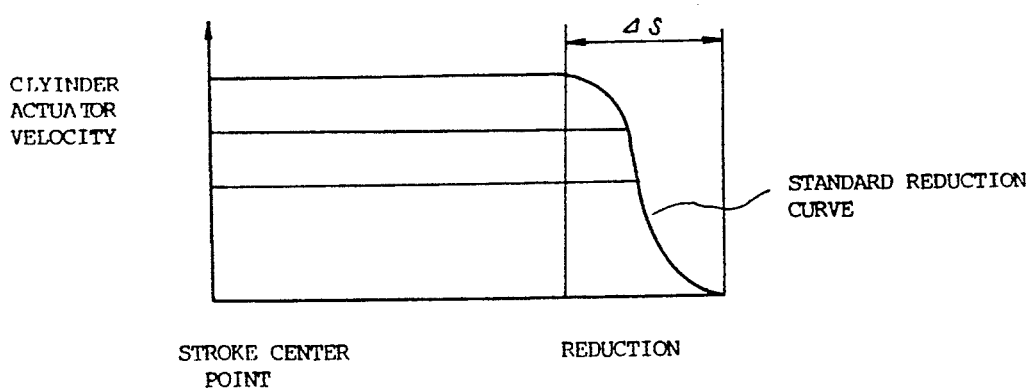
FIG. 17 is a graph showing characteristic curves of the actuating velocity of the cylinder actuator in the case of velocity reducing condition of the actuators.

The present invention also provides a system for controlling the cushioning of cylinder actuators, such as the dipper cylinder 8, the bucket cylinder 14 and the boom cylinder 16 so as to damp the impact occurring at respective ends of the cylinder actuators during operation of the cylinder actuators. For the description of the operation of the control system, the internal constitution of the electronic controller 24 shown in FIG. 1 is incorporated in FIG. 15. As shown in FIG. 15, the electronic controller 24 comprises: a ROM 116 operating under the control of a CPU 115; a RAM 117 operating under the control of CPU 115; an A/D signal converter 118 adapted to convert analog signals from the control levers/pedals 21 into digital signals under the control of CPU 115; an A/D signal converter and counter 118 adapted to convert analog signals from positional sensors 23b, 23e and 23f into digital signals, respectively, under the control of CPU 115; a pair of D/A signal converters 120 and 121 adapted to convert digital signals from the A/D signal converter 118 and the A/D signal converter and counter 119 into analog signals under the control of CPU 115; and three amplifiers 25a, 25b and 25c adapted to amplify analog signals from D/A signal converters 120 and 121. When respective cylinder actuators 8, 14 and 16 are in their predetermined reduction ranges during the operation of control levers/pedals 21, as they are actuated according to the manipulation of the operator, the controller 24 controls respective discharge flow rates of the first hydraulic pump 3 and the second hydraulic pump 4 and respective stroke amounts of the spools of directional control valves 9, 15 and 17 of cylinder actuators 8, 14 and 16, so that operations of cylinder actuators 8, 14 and 16 are carried out along the reduction curve shown in FIG. 17, thereby enabling them to stop without being subject to impact.

In the control system having the above-mentioned construction according to the present invention, respective manipulation mounts for cylinder actuators 8, 14 and 16 are sent from the control levers/pedals 21 to the controller 24. According to the received manipulation mounts, the controller 24 calculates respective amounts of hydraulic fluid to be supplied to cylinder actuators 8, 14 and 16 from the first hydraulic pump 3 and the second hydraulic pump 4, as well as respective stroke amounts of directional control valves 9, 15 and 17 of cylinder actuators 8, 14 and 16. The result from the calculation of controller 24 is sent in the form of electric signals to electronic proportional valve blocks 22a and 22b and inclination angle control valves 19a and 19b via amplifiers 25a, 25b and 25c. By the electric signals, respective discharge flow rates of the first and the second hydraulic pumps 3 and 4 are determined to control respective movements of spools of directional control valves 9, 15 and 17 for operating cylinder actuators.

When respective piston rods of cylinder actuators 8, 14 and 16 reach the ends of the corresponding cylinders, the respective discharge flow rates of hydraulic pumps 3 and 4 and respective spool stroke amounts of directional control valves 9, 15 and 17 are controlled again such that even in the operation of control levers/pedals 21, respective piston rods are positioned at the ends of corresponding cylinders, without being subjected to impact, thereby enabling them to stop smoothly.

Figure 16:
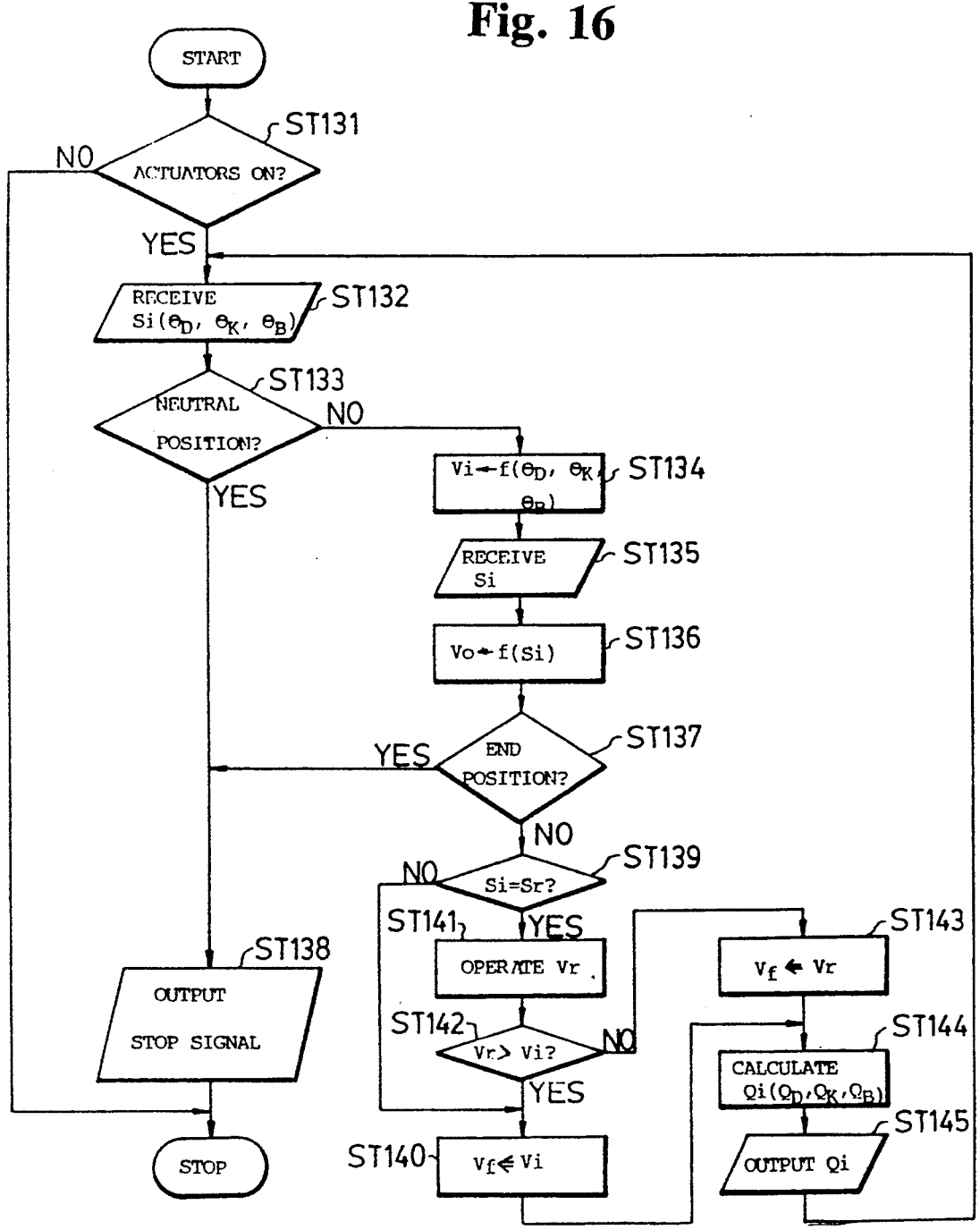
FIG. 16 is a flow chart showing an automatic control process preventing a shock occurring between the cylinder actuators and the hydraulic fluid at respective ends of the cylinder actuators according to the present invention.

Referring to FIG. 16, there is shown a flowchart of a process for controlling the cushioning of the cylinder actuators in accordance with the present invention. As shown in the flowchart, it is determined at the step 131 whether respective cylinder actuators, that is the cylinder 8, the bucket cylinder 14, and boom cylinder 16, are in operation. If respective cylinder actuators are in operation, the electronic controller 24 receives respective manipulation amounts $\Theta_p$, $\Theta_k$ and $\Theta_b$ for cylinder actuators from the control levers/pedals 21, via the A/D signal converter 118 of FIG. 15, at step 132. Thereafter, it is determined by respective manipulation amounts $\Theta_p$, $\Theta_k$ and $\Theta_b$ from the control levers/pedals 21, at the step 133, whether the operation position of control levers/pedals 21 is at its neutral state. If the operation positions of control levers/pedals 21 are at their neutral state, respective predetermined velocities Vi of cylinder actuators 8, 14 and 16 are calculated on the basis of respective manipulation mounts $\Theta_p$, $\Theta_k$ and $\Theta_b$ from the control levers/pedals 21, at the step 134. At the step 135, the electronic controller 24 receives respective current operation position values of cylinder actuators 8, 14 and 16 sensed by corresponding sensors 23b, 23e and 23f, via the A/D signal converter and counter 119. The used sensors 23b, 23e and 23f are cylinder stroke sensors, each of which cooperates with a plurality of spaced magnetic members attached to the piston rod of a corresponding cylinder actuator to sense the current operation position of the cylinder actuator and converts the value of the current operation position into an electric signal which is in turn sent to the electronic controller 24. On the other hand, potentiometers which are provided at respective links among the operating members, such as the boom, the bucket and the dipper stick, operated by operations of cylinder actuators 8, 14 and 16, sense angles formed among the links so as to obtain respective operation positions and velocities of operating members. Thereafter, current cylinder velocities Vo are calculated from the respective operation positions Si of cylinder actuators and respective consumed times, at step 136. It is then determined at the step 137 whether each piston rod is positioned at the end of its corresponding cylinder, that is at the position where it can no longer move. If each piston rod is positioned at the position where it can no longer move, the corresponding cylinder actuator is still in operation, it is determined at the step 139 whether the current operation position of each cylinder actuator is in the reduction range. If the current operation position of each cylinder actuator is in the reduction range, the reduction velocity Vr is calculated on the basis of the standard reduction curve, and according to the operation position of each cylinder actuator, in the reduction range of the graph of FIG. 17, at step 141. Then, the procedure proceeds to step 142. It is determined at step 142 whether respective obtained reduction velocities Vr at step 141 is higher than respective predetermined velocities Vi of corresponding cylinder actuators based on the manipulation mounts of control levers/pedals 21 and predetermined at step 134. If Vr>Vi, the procedure proceeds to step 140 to set the above-mentioned predetermined velocities Vi to respective velocity values output to cylinder actuators 8, 14 and 16. When Vr<Vi, the procedure proceeds to step 143 to set reduction velocities Vr to respective output velocity values. On the other hand, if it is determined at step 139 that the current operation position of each cylinder actuator is in the range other than the reduction range defined just before the stroke end of the cylinder actuator, which occurs when the current operation state is not the reduction state, the procedure proceeds to step 140 to set each output velocity Vf to each predetermined velocity Vi.

After the completion of step 140 or step 143, step 144 is executed. At step 144, respective mounts Qi of hydraulic fluid to be discharged out of hydraulic pumps 3 and 4 to cylinder actuators 8, 14 and 16 and respective spool stroke mounts So of directional control valves 9, 15, and 17 are calculated on the basis of corresponding output velocity Vf set at step 140 or step 143. At step 145, the calculated hydraulic fluid amounts Qi are converted into electric signals by the D/A signal converter 120 and sent to directional control valves 9, 15 and 17, via amplifiers 25a and 25b and electronic proportional valve blocks 22a and 22b, respectively. On the other hand, the spool stroke amounts So are converted into electric signals by the D/A signal converter 122 and sent to the amplifier 25c and inclination angle control valves 19a and 19b, respectively, so that respective inclination angles of hydraulic pumps 3 and 4 are controlled by inclination angle control mechanisms 20a and 20b. Thus, respective mounts Qi of hydraulic fluid to be discharged out of hydraulic pumps 3 and to cylinder actuators 8, 14 and 16 are controlled. After the completion of step 145, the procedure returns to the step 132.

On the other hand, if it is determined at step 133 that the control levers/pedals 21 are positioned at its neutral state, or at step 137 that each piston rod is positioned at the end of a corresponding cylinder, the procedure proceeds to the 138 to stop operations of cylinder actuators 8, 14 and 16. Through the above-mentioned process, it is possible to prevent the cylinder actuators from being subjected to impact and thus accomplish a smooth stoppage of the cylinder actuators.

In addition, the present invention provides a control system for automatically controlling a lifting operation in order to prevent a safety accident resulting from tipping of the excavator due to an overweight load to be lifted by the excavator. Hereinafter, the control system will be described in greater detail, in conjunction with the accompanying drawings.

Figure 18:
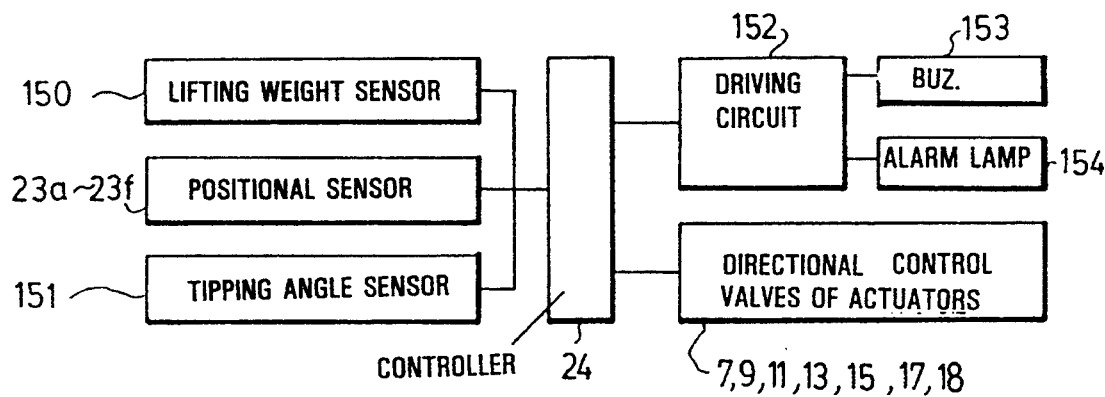
FIG. 18 is a block diagram showing the construction of a control apparatus for automatically preventing a tipping accident of the excavator due to an overweight load during a lifting operation in accordance with the present invention.

As shown in FIG. 18, which is a block diagram showing a construction of the control apparatus for automatically controlling the lifting operation in accordance with the present invention, the electronic controller 24 of the control apparatus is electrically connected at the input port thereof to a lifting weight sensor 150 for sensing a lifting weight Ws imposed on the operating members comprising the hook, the dipper stick, and the boom. As described hereinbefore, the positional sensors 23a to 23f are electrically connected to the input port of the controller 24 in order to sense the position Si of the actuator 6, 8, 10, 12, 14, 16 and output an electrical signal corresponding to the sensed position of the actuator to controller 24. The controller 24 is thus caused to calculate the displacement value of the actuator. Also, the controller 24 input port is electrically connected to a tipping angle sensor 151 for sensing a tipping angle $\Theta_F$ of the excavator during the lifting operation. On the other hand, the output port of the controller 24 is electrically connected to a driving circuit 152 for driving a buzzer 153 and an alarm lamp 154 in accordance with an output signal of the controller 24 in order to alarm the operator to the possibility of tipping accident.

Also, the controller 24 is electrically connected to the directional control valves 7, 9, 11, 13, 15, 17 and 18 of the actuators so that the controller 24 controls the control valves 7, 9, 11, 13, 15, 17 and 18 by way of the amplifiers 25a and 25b and the pilot valve blocks 22a and 22b in order to make the control valves of the actuators stop actuating irrespective of the handling of the operator when lifting a weight over a predetermined level.

Conventionally, if the weight of the subject material to be lifted is over 80% of an allowable maximum lifting capability Wmax of the excavator, it is considered that an excavator tipping accident seldom occurs, which depends on the working conditions, such as a ground surface condition and the like. In addition, if the weight of the subject material to be lifted is over 90% of the allowable maximum lifting capability Wmax of the excavator, it is considered that an excavator tipping accident often occurs irrespective of the working conditions. Therefore upon considering the above theory, the control system of the present invention controls the lifting operation of the excavator such that, in case of sensing a lifting weight over 80% of the allowable maximum lifting capability Wmax of the excavator, the controller 24 outputs an electric signal to the alarm driving circuit 152 in order to drive it. The buzzer 153 and the alarm lamp 154 are thus driven in order to alarm the operator to the overweight load. However, the lifting operation of the excavator in this case is controlled to be continued irrespective of the overweight load. On the other hand, upon sensing a load over 90% of the allowable maximum lifting capability Wmax of the excavator, the controller 24 of the control system of this invention outputs electric signals to the pilot valve blocks 22a and 22b by way of the amplifiers 25a and 25b in order to cause the directional control valves 7, 9, 11, 13, 15, 17 and 18 of the actuators to stop the lifting operation of the excavator irrespective of the handling of the operator.

Figure 19:
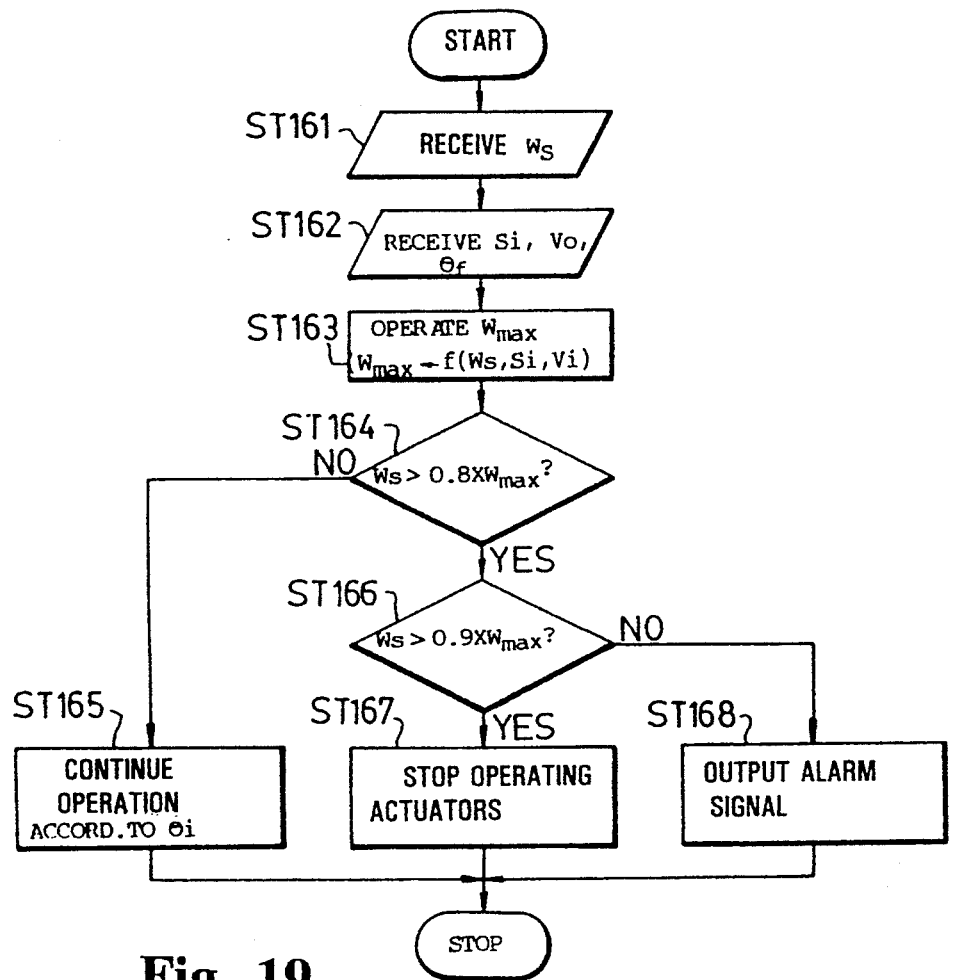
FIG. 19 is a flow chart showing an automatic control process for automatically preventing a tipping accident of the excavator performed by the control apparatus of FIG. 18.

FIG. 19 is a flow chart showing an automatic control process for automatically controlling the lifting operation of the excavator in order to prevent the tipping accident.

As described by this flow chart, the control process starts at step 161, wherein the controller 24 receives an electric signal indicating the weight Ws of the material to be lifted from the lifting weight sensor 150. Also, the controller 24 receives electric signals representing the operational positions Si of the actuators from the positional sensors 23a to 23f, the tipping angle $\Theta_F$ of the excavator from the tipping angle sensor 151. Thus, the controller 24 calculates the operational velocity Vo of the actuators by virtue of the operational positions Si. Thereafter, the process proceeds to step 163 wherein the controller 24 operates the received values Vo, Ws and $\Theta_F$ by a functional equation previously programmed therein. A maximum allowable lifting capability Wmax of the excavator is thus calculated.

The controller 24 then performs a next inquiry step 164 in order to determine whether the lifting weight Ws is over 80% of the calculated allowable maximum lifting capability Wmax of the excavator. If the lifting weight Ws is equal to or lower than 80% of the calculated allowable maximum lifting capability Wmax, it is considered that the lifting operation is performed under a stable and adjustable condition. Thus, the process proceeds to a step 165 wherein the controller 24 controls the lifting operation of the excavator to be continued in accordance with the handling of the operator. However, if the lifting weight Ws is over 80% of the calculated allowable maximum lifting capability Wmax, the controller 24 performs a next inquiry step 166 wherein it is determined whether the lifting weight Ws is over 90% of the calculated allowable maximum lifting capability Wmax, of the excavator. If the lifting weight Ws is equal to or lower than 90% of the calculated allowable maximum lifting capability Wmax, it is considered that the lifting operation is performed under a relatively stable condition although a tipping accident seldom occurs due to such an overweight load and the working condition. Thus, the process proceeds to step 168 wherein the controller 24 outputs an electric signal to the alarm driving circuit 152 in order to drive the circuit 152, thereby allowing the buzzer 153 and the alarm lamp 154 to be driven in order to alarm the operator to the overweight load. However, the lifting operation of the excavator in this case is controlled to be continued irrespective of the overweight. On the other hand, upon determining that the lifting weight Ws is over 90% of the allowable maximum lifting capability Wmax of the excavator, it is considered that a tipping accident of the excavator may occur due to the overweight load. Thus, the controller 24 performs step 167 in order to output an electric signal to the pilot valve blocks 22a and 22b by way of the amplifiers 25a and 25b to make the directional control valves 7, 9, 11, 13, 15, 17 and 18 of the actuators stop the lifting operation of the excavator irrespective of the handling of the operator.

Therefore, the control system efficiently controls the lifting operation of the excavator so that a tipping accident, owing to a lifting weight over a predetermined allowable maximum lifting capability of the excavator, can be prevented, resulting in a stable lifting operation.

As described above, the automatic control system for the actuators of excavator according to this invention provides operational effects as follows.

First, the control system provides an advantage in that the travelling mode of the travelling motors in case of handling the control levers/pedals for the travelling motor in their maximum position is automatically changed between the first and second step travelling modes in order to efficiently correspond to the load imposed on the travelling motors depending on the ground surface condition. Thus, the control system of this invention accomplishes an efficient travelling operation of the travelling motors.

Second, the control system provides another advantage in that the brake mechanism for the swing motor section is automatically controlled in order to be efficiently actuated by the controller in accordance with the handling value for the swing motor control lever, thereby accomplishing an efficient control for the braking operation for the swing motor section without harming the swing motor section of the excavator.

Third, the control system provides another advantage in that it automatically controls the operation of the swing motor and the boom cylinder in order to efficiently accomplish a synchronous operation thereof by simply setting a relative actuating velocity between the swing motor and the boom cylinder by the control switch, thereby causing the swinging of the swing motor and the lifting of the boom to be smoothly and continuously performed at the same time.

Fourth, the control system provides another advantage in that it automatically controls, in case of handling the control levers/pedals for initiating the actuators or stopping the actuating of the actuators, flow rate of hydraulic fluid from the main hydraulic pumps to each actuator to be automatically controlled, thereby efficiently preventing a mechanical shock occurring between the actuator and the hydraulic fluid.

Fifth, the control system provides another advantage in that it automatically controls the flow rate of the hydraulic fluid for the cylinder actuators, such as the dipper cylinder, the bucket cylinder and the boom cylinder, in order to drive the cylinder actuators without occurrence of shock at an end of the cylinder of each cylinder actuator, thereby efficiently controlling cushioning of the cylinder actuator.

Sixth, the control system provides another advantage in that it efficiently controls a lifting operation of an excavator so that a tipping accident, which could occur owing to a lifting weight over a predetermined allowable maximum lifting capability of the excavator, can be efficiently prevented, thereby providing a stable lifting operation of the excavator.

Although the preferred embodiments of the present invention have been disclosed for illustrative purpose, those skilled in the art will appreciate that various modifications are possible, without departing from the scope and spirit of the invention as disclosed in the accompanying claims.

What is claimed is:

1. In an excavator including a boom cylinder actuator for actuating a boom, a dipper cylinder actuator for actuating a dipper stick, a bucket cylinder actuator for actuating a bucket, a swing motor actuator for swinging an upper frame of the excavator with respect to a lower frame thereof and travelling motor actuators for running the excavator, a control process for automatically controlling a control apparatus controlling the operation of said actuators, said control apparatus comprising an electronic controller controlling the operation of said actuators, main hydraulic pumps for supplying hydraulic fluid to said actuators, a sub-hydraulic pump for supplying pilot hydraulic fluid, a plurality of directional control valves each connected to said main hydraulic pumps and said electronic controller for controlling an operational direction of said actuators and also a quantity of said hydraulic fluid, pilot valve blocks adapted to controllably move spools of said directional control valves in accordance with electronic control signals outputted from said electronic controller, inclination angle control valves disposed between said controller and said main hydraulic pumps for controlling inclination angles of said main hydraulic pumps in order to control said quantity of hydraulic fluid output therefrom, positional sensors provided at respective actuators in order to sense positional displacement values of said actuators, control levers/pedals for outputting respective electric signals corresponding to handling values for said actuators to the controller, and a plurality of amplifiers amplifying electric signals output from said controller to said pilot valve blocks and said inclination angle control valves, the control process comprising the steps of:

determining whether said handling values for the travelling motors received from said control levers/pedals are zero; generating control current signals for controlling said pilot valve blocks and said inclination angle control valves of said main hydraulic pumps from said handling values if said handling values are not zero, and then output said control current signals; turning off a solenoid valve of said travelling motors, said solenoid valve disposed between said travelling motors and said sub-hydraulic pumps in order to control an inclination angle of each travelling motor, if said handling value are zero;

determining whether said solenoid valve of the travelling motors has a current input thereto upon receiving electric signals representing the actuating velocity of said travelling motors from said positional sensors of said travelling motors, if the handling values are at their maximum values; and comparing said actuating velocity of the travelling motors with a control velocity and an allowable minimum velocity in order to convert the travelling mode of the excavator between a first step travelling mode wherein said solenoid valve is turned off and a second step travelling mode wherein said solenoid valve is turned on, depending on the result of said determination of whether current is input to said solenoid valve of said travelling motors.

2. A control process as claimed in claim 1, wherein said control velocity for the first step travelling mode is set to approximately 90% of a maximum travelling velocity in the first step travelling mode.

3. A control process as claimed in claim 1, wherein said allowable minimum velocity is set to a predetermined velocity higher than a cut-off velocity of the travelling motors, and at said cut-off velocity resulting from an overload occurring on the travelling motors, the travelling operation of the travelling motors is stopped.

4. In an excavator comprising actuators including a boom cylinder for actuating a boom, a dipper cylinder for actuating a dipper stick, a bucket cylinder for actuating a bucket, a swing motor for swinging an upper frame of the excavator with respect to a lower frame thereof and travelling motors for running said excavator, a control apparatus for automatically controlling the operation of said actuators of the excavator, said control apparatus comprising:

an electronic controller controlling the operation of said actuators;

main hydraulic pumps supplying hydraulic fluid to said actuators;

a plurality of directional control valves each connected to said main hydraulic pumps and said electronic controller for controlling operational direction of said actuators and also a quantity of said hydraulic fluid flow;

pilot valve blocks adapted to controllably move spools of said directional control valves in accordance with electric control signals outputted from said electronic controller;

inclination angle control valves disposed between the controller and the main hydraulic pumps for controlling inclination angles of the main hydraulic pumps in order to control said quantity of hydraulic fluid flow outputted therefrom;

positional sensors provided at respective actuators in order to sense positional displacement values of said actuators;

control levers/pedals for outputting respective electric signals, corresponding to handling values of said actuators, to the controller;

a plurality of amplifiers amplifying electric signals outputted from said controller to said pilot valve blocks and said inclination angle control valves;

a relay electrically connected to said controller to turn on or turn off a control circuit of said control apparatus in accordance with an electrical signal of the controller corresponding to a handling value of the swing motor; a solenoid valve electrically, connected to said relay, said solenoid valve turned on or turned off by said relay;

a mechanical brake disposed at reduction gears of the swing motor and connected to said solenoid vale in order to be selectively driven by said solenoid valve so as to apply, or release, a braking power for the reduction gears; and an on/off valve for initiating and stopping a swinging operation of the swing motor depending upon an on/off state of said solenoid valve; whereby the mechanical brake is controlled to immediately remove the braking power from the reduction gears when initiating the swinging operation of the swing motor and applying braking power for the reduction gears approximately 5 seconds after changing the driving state of the swing motor into a stop state.

5. In an excavator including a boom cylinder actuator for actuating a boom, a dipper cylinder actuator for actuating a dipper stick, a bucket cylinder actuator for actuating a bucket, a swing motor actuator for swinging an upper frame of the excavator with respect to a lower frame of the excavator and travelling motor actuators for running said excavator, a control process automatically controlling a control apparatus controlling the operation of said actuators, said control apparatus comprising an electronic controller for controlling the operation of said actuators, main hydraulic pumps for supplying hydraulic fluid for said actuators, a sub-hydraulic pump for supplying pilot hydraulic fluid, a plurality of directional control valves each connected to said main hydraulic pumps and said electronic controller for controlling operational direction of said actuators and also a quantity of said hydraulic fluid flow, pilot valve blocks adapted to controllably move spools of said directional control valves in accordance with electric control signals outputted from said electronic controller, inclination angle control valves disposed between the controller and the main hydraulic pumps for controlling inclination angles of the main hydraulic pumps in order to control the quantity of hydraulic fluid flow outputted therefrom, positional sensors provided at respective actuators in order to sense positional displacement values of said respective actuators, control levers/pedals for outputting respective electric signals, corresponding to handling values for said actuators, to the controller, and a plurality of amplifiers for amplifying electric signals outputted from said controller to said pilot valve blocks and said inclination angle control valves, a relay electrically connected to the controller in order to turn on or turn off the control circuit of said control apparatus in accordance with an electrical signal of said controller corresponding to a handling value for said swing motor actuator, a solenoid valve electrically connected to said relay in order to be turned on or turned off by said relay, a mechanical brake disposed at reduction gears of said swing motor actuator and connected to said solenoid valve in order to be selectively driven by the solenoid valve so as to apply or release a braking power for the reduction gears, an on/off valve for initiating and stopping a swinging operation of said swing motor actuator depending upon an on/off state of said solenoid valve, the process comprising the steps of:

determining whether said handling value for the swing motor actuator is an increasing value, representing that the control levers/pedals for said swing motor actuator were shifted from a neutral position to a swing position, or a decreasing value representing the contrary shift of the control levers/pedals for said swing motor actuator, upon receiving said handling value for said swing motor actuator from the control levers/pedals;

controlling a mechanical valve to remove the braking power thereof for the reduction gears within 0.1 second after the handling of the control levers/pedals and also turning on the on/off valve for driving the swing motor in case of said increasing value; and determining whether 5 seconds have been lapsed after the handling of the control levers/pedals in the case of the decreasing value, and upon determining that the 5 seconds have lapsed, driving the mechanical brake in order to apply the braking power for the reduction gears simultaneously with turning off the on/off valve to stop the swinging state of the swing motor.

6. In an excavator including a boom cylinder actuator for actuating a boom, a dipper cylinder actuator for actuating a dipper stick, a bucket cylinder actuator for actuating a bucket, a swing motor actuator for swinging an upper frame of the excavator with respect to a lower frame thereof and travelling motors for running said excavator, a control process automatically controlling a control apparatus controlling the operation of the actuators comprising an electric controller for controlling the operation of the actuators, main hydraulic pumps for supplying hydraulic fluid for the actuators, a sub-hydraulic pump for supplying pilot hydraulic fluid, a plurality of directional control valves each connected to the main hydraulic pumps and the electronic controller for controlling the operational direction of the actuators and the quantity of hydraulic fluid flow, pilot valve blocks adapted to controllably move spools of the directional control valves in accordance with electric control signals outputted from the electronic controller, inclination angle control valves disposed between the controller and the main hydraulic pumps for controlling inclination angles of the main hydraulic pumps in order to control the quantity of hydraulic fluid flow outputted therefrom, positional sensors provided at respective actuators in order to sense positional displacement values of the actuators, control levers/pedals for outputting respective electric signals, corresponding to handling values for the actuators, to the controller, and a plurality of amplifiers amplifying electric signals outputted from the controller to the pilot valve blocks and the inclination angle control valves, the control process further comprising the steps of:

upon receiving said electric signals corresponding to said handling values for the swing motor actuator and the boom cylinder actuator from the control levers/pedals, determining whether the handling values are a maximum value and then outputting electric signals to the pilot valve blocks and the inclination angle control valves in order to control the swing motor and the boom cylinder to be actuated at an actuating velocity in accordance with each handling value if one or more of the handling values is not the maximum value;

outputting electric signals to the pilot valve blocks to control the directional valves of the swing motor actuator and the boom cylinder actuator to be opened to their maximum amount if the handling values are maximum values, thereafter and receiving a setting value for a relative velocity of the boom cylinder actuator with respect to the swing motor actuator from a relative velocity control switch, said switch electrically connected to the controller and adapted for allowing the operator to set the relative velocity;

upon receiving said setting value, determining which of the swing motor actuator and the boom cylinder actuator is to be actuated prior to the other and calculating the quantity of the hydraulic fluid which is outputted from each main hydraulic pump for driving the swing motor actuator and the boom cylinder actuator according to the result of the determining step; and outputting electrical signals, corresponding to the quantity of the hydraulic fluid to flow from the main hydraulic pumps, to the inclination angle control valves of the main hydraulic pumps to control inclination angles of the main hydraulic pumps, thereby controlling the quantity of the hydraulic fluid flow of the main hydraulic pumps for the swing motor actuator and the boom cylinder actuator corresponding to the setting value of the relative velocity control switch.

7. A control process as claimed in claim 6, wherein said step of determining which of the swing motor actuator and the boom cylinder actuator is to be actuated prior to the other comprises the step of calculating a quantity of hydraulic fluid flow for the boom cylinder actuator simultaneously with setting a quantity of hydraulic fluid flow for the swing motor actuator as a maximum quantity if the swing motor actuator is to be actuated prior to the boom cylinder actuator.

8. A control process as claimed in claim 6, wherein said step of determining which of the swing motor actuator and the boom cylinder actuator is to be actuated prior to the other comprises the step of calculating a quantity of the hydraulic fluid flow for the swing motor actuator, simultaneously with setting a quantity of hydraulic fluid flow for the boom cylinder at a maximum quantity, if the boom cylinder actuator is to be actuated prior to the swing motor actuator.

9. A control process as claimed in claim 6, wherein said control process further comprises the steps of:

determining whether the boom cylinder actuator is to be actuated prior to the swing motor actuator and raising the boom upon receiving the setting value from the relative velocity control switch, upon determining that the boom cylinder actuator is to be actuated prior to the swing motor actuator, and to raise the boom, calculating respective quantities of hydraulic fluid to be outputted from the main hydraulic pumps to the swing motor actuator and the boom cylinder actuator corresponding to the setting value of the relative velocity control switch, outputting electric signals to the pilot valve blocks in order to control the directional control valves of the swing motor actuator and the boom cylinder actuator, and also outputting electric signals to the inclination angle control valves in order to control the inclination angles of the main hydraulic pumps to be at a maximum level.

10. A control process as claimed in claim 9, wherein said control process further comprises the step of:

upon determining that the boom cylinder actuator is to be actuated prior to the swing motor actuator, and in order to lower the boom, calculating the quantity of the hydraulic fluid for the swing motor actuator simultaneously with setting the quantity of hydraulic fluid for the boom cylinder actuator to the maximum quantity.

11. A control process as claimed in claim 9, wherein said control process further comprises the step of:

upon determining that neither the boom cylinder actuator nor the swing motor actuator is to be actuated prior to the other, setting respective quantities of the hydraulic fluid flow for the swing motor actuator and the boom cylinder actuator at maximum quantities.

12. In an excavator including a boom cylinder actuator for actuating a boom cylinder associated with a boom, a dipper cylinder actuator for actuating a dipper stick, a bucket cylinder actuator for actuating a bucket cylinder associated with a bucket, a swing motor actuator for actuating a swing motor swinging an upper frame of the excavator with respect to a lower frame thereof and travelling motor actuators for actuating travelling motors for running the excavator, a process for automatically controlling a control apparatus controlling the operation of the actuators of the excavator, the control apparatus comprising an electronic controller for controlling the operation of the actuators, main hydraulic pumps for supplying hydraulic fluid for the actuators, a sub-hydraulic pump for supplying pilot hydraulic fluid, a plurality of directional control valves each connected to the main hydraulic pumps and the electronic controller for controlling the operational direction of the actuators and the amount of hydraulic fluid flow, pilot valve blocks adapted to controllably move spools of the directional control valves in accordance with electric control signals outputted from the electronic controller, inclination angle control valves disposed between the controller and the main hydraulic pumps for controlling inclination angles of the main hydraulic pumps in order to control the amounts of hydraulic fluid discharged therefrom, positional sensors provided at respective actuators in order to sense positional displacement values of the actuators, control levers/pedals for outputting respective electric signals corresponding to handling values for the actuators to the controller, and a plurality of amplifiers amplifying electric signals outputted from the controller to the pilot valve blocks and the inclination angle control valves, the process comprising the steps of:

receiving respective manipulation amounts from the control levers/pedals and respective values corresponding to operation positions of the actuators sensed by the positional sensors, operating respective predetermined velocities of the actuators based on the manipulation amounts and respective operation velocities of the actuators based on the operation position values;

determining whether the operation state of control levers/pedals is acceleration state or reduction state;

if the operation state of control levers/pedals is the acceleration state, calculating respective optimum acceleration velocities on the basis of a standard acceleration curve and comparing the calculated optimum acceleration velocities with the corresponding predetermined velocities, respectively, so that when each acceleration velocity is lower than the corresponding predetermined velocity, the acceleration velocity is set as an output velocity, while when each acceleration velocity is equal to or greater than the corresponding predetermined velocity, the corresponding predetermined velocity is set as the output velocity;

if the operation state of control levers/pedals is the reduction state, determining whether each operation velocity is zero, and if the operation velocity is not zero, calculating each optimum reduction velocity on the basis of a reduction curve and comparing the calculated optimum reduction velocity with the corresponding predetermined velocity, so that when the reduction velocity is lower than or equal to the corresponding predetermined velocity, the output velocity is set to the predetermined velocity, while when the reduction velocity is higher than the corresponding predetermined velocity, the output velocity is set to the reduction velocity; and calculating respective output values corresponding to amounts of hydraulic fluid discharged from the main hydraulic pumps on the basis of the output velocity and sending the output values to the main hydraulic pumps, respectively.

13. In an excavator including a boom cylinder actuator actuating a boom cylinder for a boom, a dipper cylinder actuator actuating a dipper cylinder of a dipper stick, a bucket cylinder actuator actuating a bucket cylinder of a bucket, a swing motor actuator actuating a swing motor swinging an upper frame of the excavator with respect to a lower frame thereof and travelling motor actuators actuating travelling motors running the excavator, an apparatus for automatically controlling the operation of said actuators, said apparatus comprising: an electronic controller for controlling the operation of said actuators; main hydraulic pumps for supplying hydraulic fluid to said actuators; a sub-hydraulic pump for supplying pilot hydraulic fluid; a plurality of directional control valves each connected to said main hydraulic pumps and said electronic controller and controlling the operational direction of said actuators and also the quantity of hydraulic fluid flow; pilot valve blocks adapted to controllably move spools of said directional control valves in accordance with electric control signals outputted from said electronic controller; inclination angle control valves disposed between said controller and the main hydraulic pumps for controlling inclination angles of the main hydraulic pumps to control the quantity of hydraulic fluid flow outputted therefrom; positional sensors provided at respective actuators in order to sense positional displacement values of said actuators; control levers/pedals for outputting respective electric signals, corresponding to handling values for said actuators, to said controller; a plurality of amplifiers amplifying electric signals outputted from said controller to said pilot valve blocks and said inclination angle control valves;

means for storing both a specific reduction curve defining respective reduction velocities of said actuators for stopping said actuators without impact and respective reduction ranges of said actuators therein;

at least one A/D signal converter adapted to convert analog signals from the control levers/pedals and positional sensors into digital signals, said analog signals being indicative of manipulation amounts of the control levers/pedals and current operation positions of said actuators;

at least one D/A signal converter adapted to convert said digital signals from said at least one A/D signal converter;

amplifying means for amplifying analog signals output from said D/A signal converter, said amplifying means comprising said amplifiers; and control means connected to said storing means and for receiving the output signals from said A/D signal converting means, determining on the basis of said received output signals whether said boom cylinder, said dipper cylinder and said bucket cylinder are operated in the corresponding stored reduction ranges, and if said cylinder actuators are operated in their stored reduction ranges, outputting control signals, indicative of respective required discharge flow rates of said main hydraulic pumps and respective required stroke amounts for said spools of directional control valves of said cylinder actuators, to said at least one D/A signal converter, whereby said cylinder actuators operate in accordance with the specific reduction curve to stop said cylinder actuators without impact.

14. In an excavator including a boom cylinder actuator for actuating a boom cylinder associated with a boom, a dipper cylinder actuator for actuating a dipper cylinder associated with a dipper stick, a bucket cylinder actuator for actuating a bucket cylinder associated with a bucket, a swing motor actuator for actuating a swing motor swinging an upper frame of the excavator with respect to a lower frame thereof, and travelling motor actuators actuating travelling motor for running said excavator, a process for automatically controlling an apparatus controlling the operation of said actuators, said apparatus comprising an electronic controller controlling the operation of said actuators, main hydraulic pumps for supplying hydraulic fluid to said actuators, a sub-hydraulic pump supplying pilot hydraulic fluid, a plurality of directional control valves connected to said main hydraulic pumps and said electronic controller for controlling operation direction of said actuators and also amounts of said hydraulic fluid flow, pilot valve blocks adapted to controllably move spools of said directional control valves in accordance with electric control signals outputted from said electronic controller, inclination angle control valves disposed between the controller and the main pumps for controlling inclination angles of the main hydraulic pumps in order to control the amount of hydraulic fluid discharged, positional sensors associated with respective actuators in order to sense positional displacement values of said respective actuators, control levers/pedals for outputting respective electric signals, corresponding to handling values for said actuators, to the controller, and a plurality of amplifiers amplifying electric signals outputted from said controller to said pilot valve blocks and said inclination angle control valves, the process comprising the steps of:

receiving respective manipulation amounts from the control levers/pedals and respective values corresponding to positions of the actuators sensed by the positional sensors;

operating respective predetermined velocities of said actuators based on said manipulation amounts and respective operation velocities of said actuators based on said position values;

determining whether piston rods of said actuators are positioned at an end of their respective cylinders;

if each piston rod is not positioned at the end of their respective cylinder, determining whether each of said actuators is reduced in its operation velocity;

if each of said actuators is reduced in its operation velocity, operating a reduction velocity and determining whether the reduction velocity is higher than said corresponding predetermined velocity;

if the reduction velocity is higher than the predetermined velocity, said predetermined velocity is set as an output velocity; if the reduction velocity is lower than or equal to the corresponding predetermined velocity, the reduction velocity is set as the output velocity; and calculating respective output values corresponding to amounts of hydraulic fluid discharged from the main hydraulic pumps on the basis of the output velocity and sending the output values to the main hydraulic pumps, respectively, thereby enabling the actuators to be controlled without being subjected to impact.

15. In an excavator including a boom cylinder actuator actuating a boom cylinder actuating a boom, a dipper cylinder actuator actuating a dipper cylinder associated with a dipper stick, a bucket cylinder actuator actuating a bucket cylinder associated with a bucket, a swing motor actuator actuating a swing motor for swinging an upper frame of the excavator with respect to a lower frame thereof and travelling motor actuators associated with travelling motors for running the excavator, an apparatus for automatically controlling the operation of said actuators, the apparatus comprising:

an electronic controller for controlling the operation of said actuators;

main hydraulic pumps for supplying hydraulic fluid to said actuators; a plurality of directional control valves each connected to said main hydraulic pumps and said electronic controller for controlling an operational direction of said actuators and also quantity of flow of said hydraulic fluid;

pilot valve blocks adapted to controllably move spools of said directional control valves in accordance with electric control signals outputted from said electronic controller;

inclination angle control valves disposed between the controller and the main pumps for controlling inclination angles of the main hydraulic pumps in order to control the quantity of hydraulic fluid output therefrom;

positional sensors provided at respective actuators in order to sense positional displacement values of said actuators;

control levers/pedals for outputting respective electric signals corresponding to handling values for said actuators to the controller;

a plurality of amplifiers amplifying electric signals output from said controller to said pilot valve blocks and said inclination angle control valves;

means for sensing a weight of a material which is to be lifted by the excavator, said weight sensing means electrically connected to an input port of the controller so as to output an electric signal corresponding to the sensed weight to the controller;

means for sensing a tipping angle of the car frame of the excavator, said means electrically connected to the input port of the controller so as to output an electric signal corresponding to the sensed tipping angle of the car frame to the controller;

an alarm driving circuit electrically connected to an output port of the controller so as to drive a buzzer and an alarm lamp each electrically connected thereto; said alarm driving circuit driving both said buzzer and said alarm lamp in response to an electric alarm signal of the controller indicative of an overweight load and exceeding the tipping state of said excavator, said alarm signal being generated by the controller and for alarming the operator in case of sensing that the lifting weight of the load is over a first level; and means for stopping a lifting operation of the excavator irrespective of handling of the lifting actuators by the operator if the load is sensed as being over a second level which is capable of tipping the excavator, whereby the operator cannot control the excavator to lift a load having a weight over said second level.

16. In an excavator including:

a boom cylinder actuator actuating a boom cylinder for actuating a boom;

a dipper cylinder actuator actuating a dipper cylinder for actuating a dipper stick;

a bucket cylinder actuator actuating a bucket cylinder for actuating a bucket;

a swing motor actuator actuating a swing motor for swinging an upper frame of the excavator with respect to a lower frame and travelling motor actuators for actuating travel motors for running said excavator;

a control process for automatically controlling a control apparatus for controlling the operation of said actuators, said apparatus comprising an electronic controller for controlling the operation of said actuator;

main hydraulic pumps for supplying hydraulic fluid for said actuators;

a subhydraulic pump for supplying pilot hydraulic fluid;

a plurality of directional control valves each connected to said main hydraulic pumps and said electronic controller for controlling the operational direction of said actuators and also a quantity of said hydraulic fluid flow through said valves;

pilot valve blocks adapted to controllably move spools of said directional control valves in accordance with electric control signals outputted from said controller;

inclination angle control valves disposed between the controller and the main hydraulic pumps for controlling inclination angles of the main hydraulic pumps in order to control said quantity of hydraulic fluid flow outputted therefrom;

positional sensors provided at respective actuators in order to sense positional displacement values of said actuators;

control levers/pedals for outputting respective electric signals corresponding to handling values for said actuators to the controller, a plurality of amplifiers amplifying electric signals outputted from said controller to said pilot valve blocks and said inclination;

angle control valves;

means for sensing a weight of a material which is to be lifted by the excavator;

said weight sensing means electrically connected to an input port of the controller so as to output an electric signal, corresponding to the sensed weight, to the controller;

means for sensing a tipping angle of the car frame of the excavator, said means electrically connected to the input port of the controller so as to output an electric signal corresponding to the sensed tipping angle of the car frame to the controller;

an alarm driving circuit electrically connected to an output port of the controller so as to drive a buzzer and an alarm lamp each electrically connected thereto, said alarm driving circuit driving both said buzzer and said alarm lamp in response to an electric alarm signal of the controller indicative of an overweight load and exceeding the tipping state of said excavator, said alarm signal being generated by said controller by operation of the signals of both said weight sensing means and said tipping angle sensing means, the control process further comprising the steps of:

calculating an allowable maximum lifting capability of the excavator upon receiving electric signals each corresponding to the weight of the material to be lifted from said means for sensing the lifting weight, respective operational positions of the actuators from the positional sensors, and a tipping angle of the car frame of the excavator from said means for sensing the tipping angle;

determining whether the lifting weight is over a predetermined rate of the calculated allowable maximum lifting capability of the excavator in order to control the lifting operation of the excavator to be continued in accordance with the handling of the operator in case of determining that the lifting weight is equal to or lower than said predetermined rate of the calculated allowable maximum lifting capability, and determining whether the lifting weight is over a higher predetermined rate of the calculated allowable maximum lifting capability of the excavator in case of determining that the lifting weight is over the predetermined rate of the calculated allowable maximum lifting capability; and driving the alarm driving circuit for allowing the buzzer and the alarm lamp to be driven in order to alarm the operator to the overweight and controlling the lifting operation of the excavator to be continued in accordance with the handling of the operator if the lifting weight is determined to be equal to or less than said higher predetermined rate of the calculated allowable maximum lifting capability;

outputting electric signals to the pilot valve blocks to make the directional control valves of the actuators stop the lifting operation of the excavator irrespective of the handling of the operator if the lifting weight is determined to be over the higher predetermined rate of the allowable maximum lifting capability of the excavator.

* * * * *

UNITED STATES PATENT AND TRADEMARK OFFICE
CERTIFICATE OF CORRECTION

PATENT NO. : 5,361,211
DATED : November 1, 1994
INVENTOR(S) : Jin H. Lee et al

It is certified that error appears in the above-indentified patent and that said Letters Patent is hereby corrected as shown below:

Column 21, line 65;
"memos" should be -- means --;

Column 24, line 40;
"$\Theta\ (9(V_B/V_S)$" should be -- $\Theta(V_B/V_S)$ --;

Column 24, line 63;
"mounts" should be -- amounts --;

Column 27, line 5;
"mounts" should be -- amounts --;

Column 27, line 8;
"mounts" should be -- amounts --;

Column 28, line 21;
"mounts" should be -- amounts --;

Column 28, line 55;
After "and" and before "to" insert -- 4 --;

Column 32, Claim 1, line 35;
"value" should be -- values --.

Signed and Sealed this

Twenty-ninth Day of August, 1995

*Attest:*

BRUCE LEHMAN

*Attesting Officer*     *Commissioner of Patents and Trademarks*